US010892488B2

(12) United States Patent
Ham et al.

(10) Patent No.: US 10,892,488 B2
(45) Date of Patent: Jan. 12, 2021

(54) ELECTRODE ACTIVE MATERIAL, LITHIUM SECONDARY BATTERY CONTAINING THE ELECTRODE ACTIVE MATERIAL, AND METHOD OF PREPARING THE ELECTRODE ACTIVE MATERIAL

(71) Applicants: Samsung Electronics Co., Ltd., Suwon-si (KR); Samsung SDI Co., Ltd., Yongin-si (KR)

(72) Inventors: Dongjin Ham, Hwaseong-si (KR); Jayhyok Song, Yongin-si (KR); Donghee Yeon, Seoul (KR); Jinhwan Park, Seoul (KR); Daechul Yoo, Incheon (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 347 days.

(21) Appl. No.: 15/873,287

(22) Filed: Jan. 17, 2018

(65) Prior Publication Data
US 2018/0205084 A1 Jul. 19, 2018

(30) Foreign Application Priority Data

Jan. 17, 2017 (KR) ........................ 10-2017-0008311
Jan. 17, 2018 (KR) ........................ 10-2018-0005871

(51) Int. Cl.
*H01M 4/58* (2010.01)
*H01M 4/04* (2006.01)
(Continued)

(52) U.S. Cl.
CPC ....... *H01M 4/5825* (2013.01); *H01M 4/0459* (2013.01); *H01M 4/366* (2013.01);
(Continued)

(58) Field of Classification Search
CPC .. H01M 4/5825; H01M 4/366; H01M 4/0459; H01M 4/8657; H01M 4/8882;
(Continued)

(56) References Cited

U.S. PATENT DOCUMENTS 5,474,861 A 12/1995 Bito et al.
6,998,069 B1 2/2006 Coluccia et al.
(Continued)

FOREIGN PATENT DOCUMENTS

EP 3065207 A1 9/2016
EP 3096380 A1 11/2016
(Continued)

OTHER PUBLICATIONS

Seong-Min Bak et al., "Structural Changes and Thermal Stability of Charged LiNixMnyCozO2 Cathode Materials Studied by Combined In Situ Time-Resolved XRD and Mass Spectroscopy," ACS Appl. Mater. Interfaces, Nov. 24, 2014, vol. 6, pp. 22594-22601.
(Continued)

*Primary Examiner* — Laura Weiner
(74) *Attorney, Agent, or Firm* — Cantor Colburn LLP

(57) ABSTRACT

An electrode active material includes: a core active material having a layered structure and capable of reversibly incorporating and deincorporating lithium; a dopant including boron and a first metal element, wherein the dopant is in the core active material; and a nanostructure disposed on a surface of the core active material and including a metal borate compound including a second metal element, wherein the second metal element is the same as the first metal element.

25 Claims, 21 Drawing Sheets
(3 of 21 Drawing Sheet(s) Filed in Color)

(51) Int. Cl.
*H01M 10/052* (2010.01)
*H01M 4/88* (2006.01)
*H01M 10/054* (2010.01)
*H01M 4/86* (2006.01)
*H01M 4/36* (2006.01)
*H01M 4/525* (2010.01)
*H01M 4/02* (2006.01)

(52) U.S. Cl.
CPC ......... *H01M 4/525* (2013.01); *H01M 4/8657* (2013.01); *H01M 4/8882* (2013.01); *H01M 10/052* (2013.01); *H01M 10/054* (2013.01); *H01M 2004/028* (2013.01)

(58) Field of Classification Search
CPC .. H01M 4/525; H01M 10/052; H01M 10/054; H01M 2004/028
See application file for complete search history.

(56) References Cited

U.S. PATENT DOCUMENTS

| | | | |
|---|---|---|---|
| 7,381,496 | B2 | 6/2008 | Onnerud et al. |
| 8,865,348 | B2 | 10/2014 | Sun et al. |
| 8,926,860 | B2 | 1/2015 | Sun et al. |
| 9,048,495 | B2 | 6/2015 | Sun et al. |
| 9,979,018 | B2 | 5/2018 | Ham et al. |
| 10,074,855 | B2 | 9/2018 | Kim et al. |
| 10,147,940 | B2 | 12/2018 | Choi et al. |
| 2008/0160410 | A1 | 7/2008 | Sun et al. |
| 2009/0087746 | A1 | 4/2009 | Kang et al. |
| 2014/0131616 | A1 | 5/2014 | Sun et al. |
| 2017/0012284 | A1 | 1/2017 | Bugga et al. |
| 2017/0018767 | A1 | 1/2017 | Park et al. |
| 2017/0069907 | A1 | 3/2017 | Zhu et al. |

FOREIGN PATENT DOCUMENTS

| | | | |
|---|---|---|---|
| JP | 2965450 | B2 | 10/1999 |
| JP | 2000012035 | A | 1/2000 |
| JP | 3864226 | B2 | 12/2006 |
| KR | 1020110063335 | A | 6/2011 |
| KR | 1020120124779 | A | 11/2012 |
| KR | 1020140087208 | A | 7/2014 |
| KR | 1020150005278 | A | 1/2015 |
| KR | 1020150010833 | A | 1/2015 |
| KR | 101523082 | B1 | 5/2015 |
| KR | 1020150109668 | A | 10/2015 |
| KR | 1020160094063 | A | 8/2016 |
| KR | 10-2016-0128 | * | 11/2016 |
| KR | 1020160128978 | A | 11/2016 |
| KR | 1020160136688 | A | 11/2016 |
| KR | 1020170008164 | A | 1/2017 |

OTHER PUBLICATIONS

European Search Report for European Patent Application No. 18152085.9 dated Jun. 11, 2018.
Aykol et al, "High-throughput computational design of cathode coatings for Li-ion batteries", Nature Communications, 2016, p. 1-12.

* cited by examiner

FIG. 7A
FIG. 7B
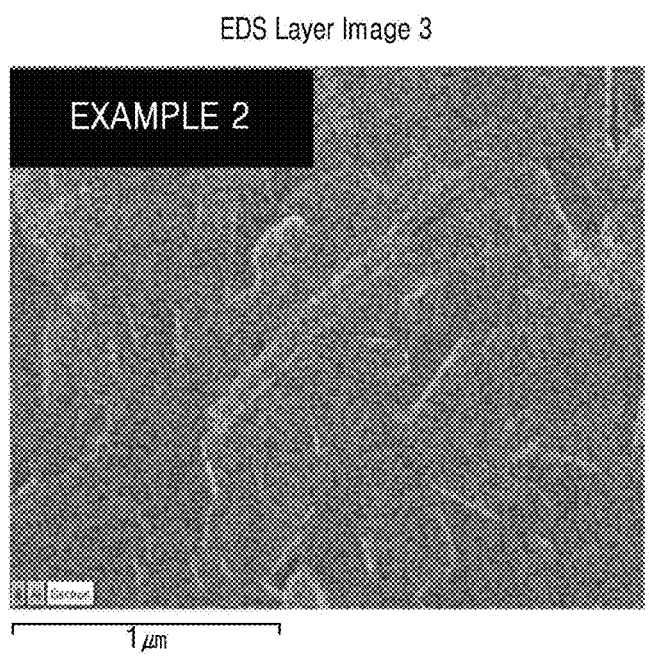
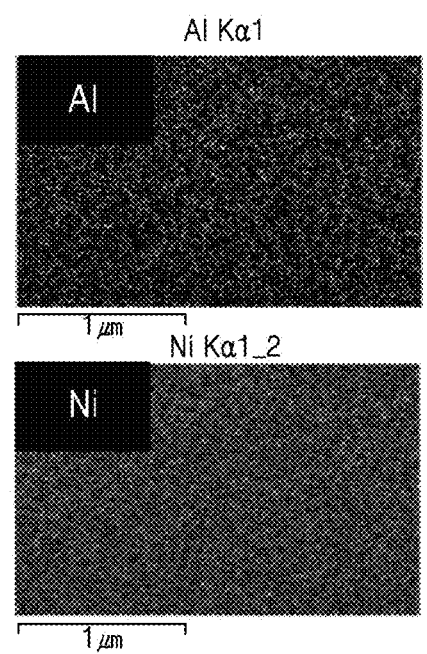
FIG. 7C

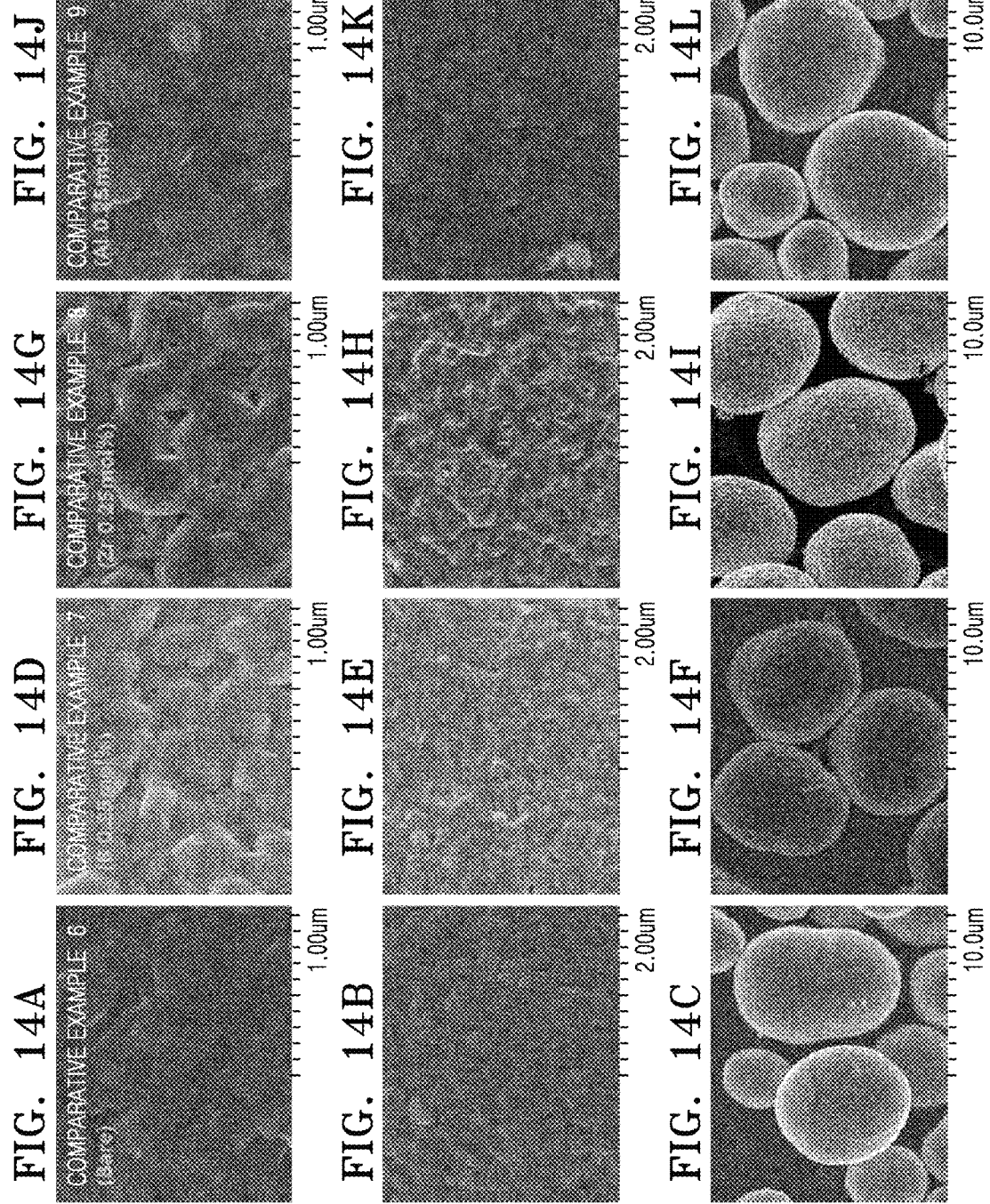

FIG. 16A
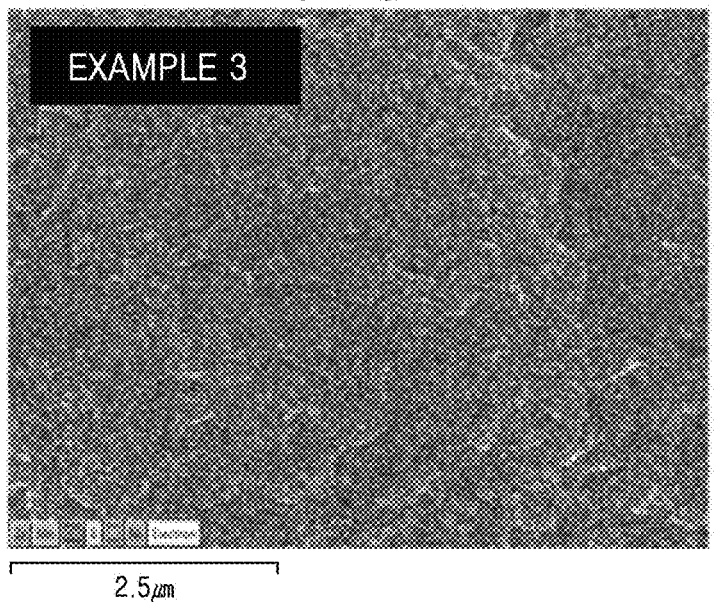
FIG. 16B
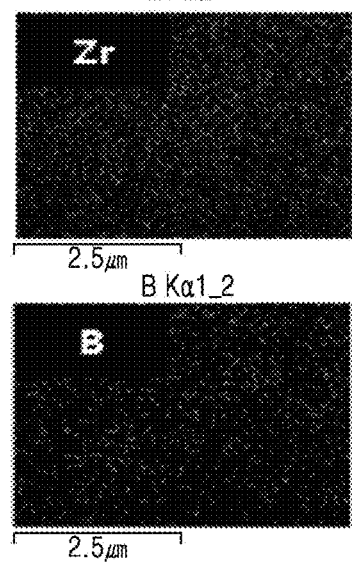
FIG. 16C
FIG. 16D
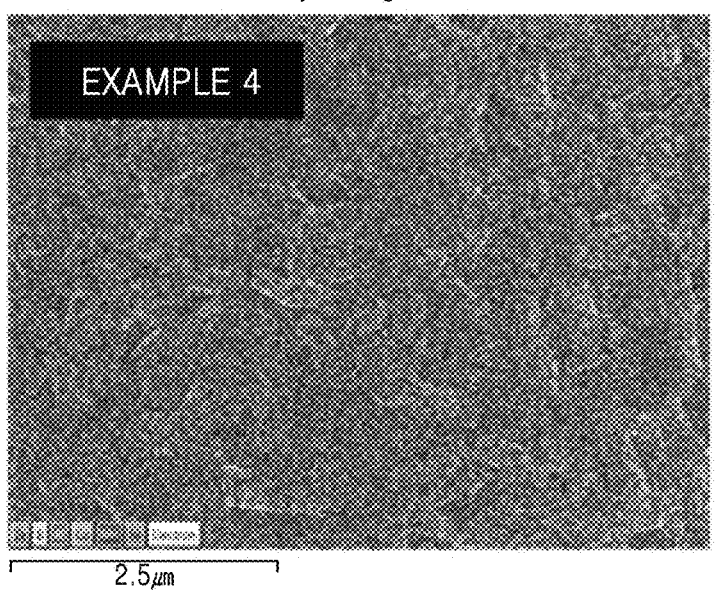
FIG. 16E
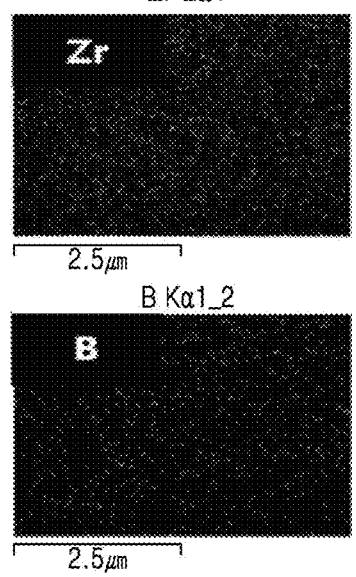
FIG. 16F

ELECTRODE ACTIVE MATERIAL, LITHIUM SECONDARY BATTERY CONTAINING THE ELECTRODE ACTIVE MATERIAL, AND METHOD OF PREPARING THE ELECTRODE ACTIVE MATERIAL

CROSS-REFERENCE TO RELATED APPLICATIONS

This application claims priority to and the benefit of Korean Patent Application No. 10-2017-0008311, filed on Jan. 17, 2017, and Korean Patent Application No. 10-2018-0005871, filed on Jan. 17, 2018, in the Korean Intellectual Property Office, and all the benefits accruing therefrom under 35 U.S.C. § 119, the contents of which in their entirety are incorporated herein by reference.

BACKGROUND

1. Field

The present disclosure relates to electrode active materials, lithium secondary batteries containing the electrode active materials, and methods of preparing the electrode active materials.

2. Description of the Related Art

For a small apparatus having high performance, it is desirable for a lithium secondary battery to have a high energy density, in addition to factors such as a decreased size and weight. As a result, the development of a lithium secondary battery having a high capacity is ongoing.

To embody lithium secondary batteries suitable for such uses, positive active materials having a high capacity has been studied. Lithium cobalt oxide ($LiCoO_2$), which is a single component, may be used as a positive active material for a lithium secondary battery. A layered lithium composite metal oxide having high capacity has also been used as a positive active material. To further increase the capacity of a battery, research has been conducted into increasing the nickel content contained in a lithium composite metal oxide.

However, a lithium composite metal oxide having a high nickel content may be structurally instable, and thus, the fine lattice structure of the active material may be damaged. As a result, the lifetime characteristics of a battery including such a material are substantially reduced.

Therefore, it is desirable to develop a positive active material capable of improving lifetime characteristics of a battery while having a high capacity. Furthermore, to realize a high-capacity lithium secondary battery having improved life characteristics, it is also desirable to develop a negative active material having an improved structure.

SUMMARY

Provided is an electrode active material capable of improving the lifetime characteristics of a lithium secondary battery.

Provided is a lithium secondary battery including the electrode active material.

Provided is a method of preparing the electrode active material.

Additional aspects will be set forth in part in the description which follows and, in part, will be apparent from the description, or may be learned by practice of the presented exemplary embodiments.

According to an aspect of an exemplary embodiment, an electrode active material includes a core active material having a layered structure and capable of reversibly incorporating and deincorporating lithium; a dopant including boron and first metal element in the core active material; and a nanostructure disposed on a surface of the core active material and including a metal borate compound containing a second metal element, wherein the second metal element is the same as the first metal element.

The first metal element may be intercalated in the layered-structure of the core active material.

In an embodiment, the first metal element may be configured to contract or expand the layered structure of the core active material, and may include aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), gold (Au), or a combination thereof.

In an embodiment, the first metal element may further include lithium (Li).

In an embodiment, the boron and the first metal element may be paired together in the layered structure of the core active material and are configured to contract and expand the layered structure of the core active material.

In an embodiment, a total amount of the boron and the first metal element in the dopant, and boron and the second metal element contained in the metal borate compound may be in a range of about 0.3 mole percent (mol %) to about 10 mol % based on 1 mole of the core active material.

The total amount of the first metal element and the second metal element is about 0.25 mol % or greater based on 1 mole of the core active material.

In an embodiment, a molar ratio of the total amount of the first metal element and the second metal element to the total amount of boron (B) in the dopant and boron contained in the metal borate compound may be in a range of about 1:10 to about 30:1.

In an embodiment, the aspect ratio of the nanostructure may be in a range of about 1 to about 200.

In an embodiment, the nanostructure may include a nanowire, a nanorod, a nanoplate, a nanobelt, a nanoribbon, or a combination thereof.

In an embodiment, the metal borate compound may be a compound represented by Formula 1:

$$M_xB_yO_z \qquad \text{Formula 1}$$

In Formula 1, M is a material configured to contract or expand the layered structure of the core active material and includes aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), gold (Au), or a combination thereof; and x, y, and z satisfy $1 \le x < 30$, $1 \le y < 10$, and $1 < z < 40$.

In an embodiment, the metal borate compound may be a compound represented by Formula 2:

$$mMO_\beta\text{-}nB_2O_3 \qquad \text{Formula 2}$$

In Formula 2, M is a material configured to contract or expand the layered structure of the core active material and includes aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), and gold (Au), or a combination thereof; β is a number that is determined by an oxidation state of M; and m:n may be in a range of 0.5:0.5 to 9:2.

In an embodiment, the metal borate compound may include an aluminum borate compound, a zirconium borate compound, a Li-containing compound thereof, or a combination thereof.

In an embodiment, the aluminum borate compound may include $AlBO_3$, $Al_4B_2O_9$, $Al_5BO_9$, $Al_{18}B_4O_{33}$, a Li-containing compound thereof, or a combination thereof.

In an embodiment, the zirconium borate compound may include $ZrBO_3$, $ZrB_2O_5$, $LiZrB_3O_7$, $Li_2ZrB_4O_9$, a Li-containing compound thereof, or a combination thereof.

In an embodiment, the dopant may include AlB, $Al_4B_2$, $Al_5B$, $Al_{18}B_4$, ZrB, $ZrB_2$, $ZrB_3$, $ZrB_4$, a Li-containing compound thereof, or a combination thereof.

In an embodiment the core active material may include a positive active material or a negative active material.

In an embodiment, an interlayer distance of the layered structure of the core active material with the dopant is increased as compared to the interlayer distance of the layered structure of the core active material without the dopant.

In an embodiment, the electrode active material may include residual lithium at an amount in a range of about 100 parts per million (ppm) to about 20,000 ppm.

In an embodiment, the core active material may be a compound represented by Formula 3 having a layered structure.

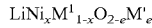

Formula 3

In Formula 3, $M^1$ is a Group 4 to a Group 14 element, or a combination thereof; M' is an anion element including F, S, Cl, Br, or a combination thereof; and x and e satisfy 0.7≤x<1 and 0≤e<1.

In an embodiment, the core active material is a secondary particle including agglomerated primary particles, and the nanostructure that includes the metal borate may be disposed on a surface of the primary particle, a grain boundary between the primary particles, a surface of the secondary particle, or a combination thereof.

According to an aspect of an exemplary embodiment, a lithium secondary battery includes the electrode active material.

According to an aspect of an exemplary embodiment, a method of preparing the electrode active material includes: dry-mixing a precursor material for the core active material, a metal element precursor, and a borate precursor to prepare a mixture; and heat-treating the mixture to prepare the electrode active material.

In an embodiment, the metal element of the metal element precursor is intercalated in the layered structure of the core active material and at the same time forms the nanostructure on the surface of the core active material The precursor material for the core active material may be in the form of a hydrate.

In an embodiment, the metal element precursor may include an aluminum precursor, a zirconium precursor, or a combination thereof.

In an embodiment the aluminum precursor may include $Al(NO_3)_3$, $Al_2O_3$, $AlPO_4$, $Al(OH)_3$, $Al(ClO_4)_3$, $AlK(SO_4)_2$, $Al_2(SO_4)_3$, $Al_2S_3$, $AlF_3$, a hydrate thereof, or a combination thereof; the zirconium precursor may include $Zr(NO_3)_4$, $ZrO_2$, $Zr(HPO_4)_2$, $Zr(OH)_4$, $Zr(ClO_4)_4$, $Zr(SO_4)_2$, $(CH_3CO_2)_xZr(OH)_y$ (where x+y=4), $ZrCl_4$, $ZrF_4$, a hydrate thereof, or a combination thereof; and the borate precursor may include $H_2BO_3$, $LiBH_4$, $NaBH_4$, $KBH_4$, $Mg(BH_4)_2$, $Ca(BH_4)_2$, $Sr(BH_4)_2$, $NH_3BH_3$, $Al(BH_4)_3$, or a combination thereof.

In an embodiment, an amount of the metal element precursor and the borate precursor may be determined such that the molar ratio of the metal element in the metal element precursor to boron (B) is in a range of about 1:10 to about 30:1.

In an embodiment, the heat-treating of the mixture may be performed in air or in an oxygen atmosphere at a temperature of about 600° C. to about 1,000° C.

In an embodiment, the method may further include washing the electrode active material after the heat-treating.

In an embodiment, an amount of residual lithium in the electrode active material before the washing may be in a range of about 1,000 ppm to about 20,000 ppm, and an amount of residual lithium in the electrode active material after the washing may be in a range of 100 ppm to about 5,000 ppm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the exemplary embodiments, taken in conjunction with the accompanying drawings in which:

FIGS. 7A to 7C are color images obtained by scanning electron microscope (SEM) EDAX mapping analysis of the positive active materials prepared according to Example 2;

FIGS. 14A to 14L are images which show the SEM analysis results of the positive active materials prepared in Comparative Example 6 (FIGS. 14A to 14C), Comparative Example 7 (FIGS. 14D to 14F), Comparative Example 8 (FIGS. 14G to 14 I), and Comparative Example 9 (FIGS. 14J to 14L);

FIGS. 16A to 16J are color images which show the results of SEM EDAX mapping analysis performed on the positive active materials prepared in Example 3 (FIGS. 16A to 16C), Example 4 (FIGS. 16D to 16F), and Example 5 (FIGS. 16G to 16J);

DETAILED DESCRIPTION

Figure 1:
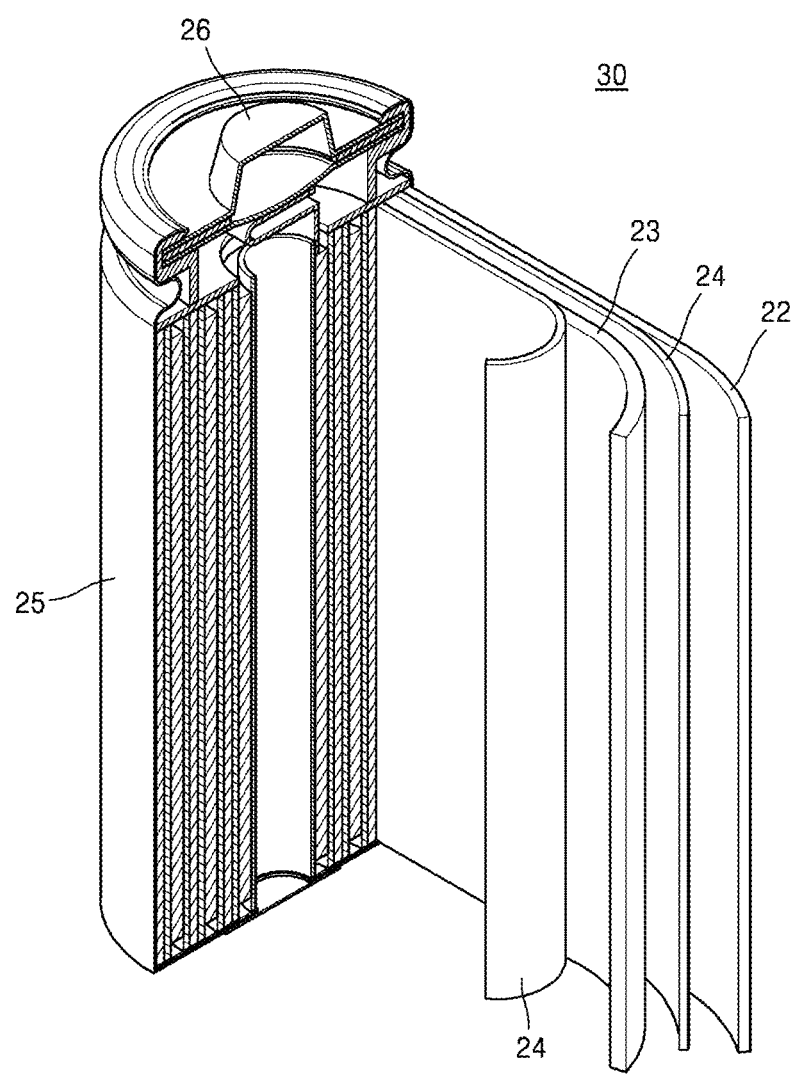
FIG. 1 is a schematic view of a lithium secondary battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

As used herein, the term "and/or" includes any and all combinations of one or more of the associated listed items. "or" means "and/or." As used herein, the singular forms "a," "an," and "the" are intended to include the plural forms, including "at least one," unless the content clearly indicates otherwise. "At least one" is not to be construed as limiting "a" or "an." Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the present invention will be described in detail.

An aspect of the present disclosure provides an electrode active material including a core active material having a layered structure and capable of reversibly incorporating and deincorporating lithium; and a dopant including boron (B) and first a metal element in the core active material; and a nanostructure disposed on a surface of the core active material and including a metal borate compound containing a second metal element, wherein the second metal element is the same as the first metal element.

The electrode active material may improve the lifetime characteristics of the lithium secondary battery by simultaneously doping both boron (B) and a metal element in the core active material and by coating a borate compound on the core active material, the borate compound containing a metal element that is the same as the doped metal element. Accordingly, the lithium secondary battery may also have improved lifespan characteristics.

In an embodiment, the core active material may have a layered structure, and by doping boron and a metal element in the layered structure of the core active material, the interlayer distance of the layered structure of the core active material may be increased. Also, due to lattice distortion resulting from the increased interlayer distance, the lattice structure of the doped core active material may be stabilized. Accordingly, lithium ions may be stably charged or discharged, and thus, the lifetime characteristics of lithium secondary battery may be improved.

Also, a nanostructure including a metal borate compound containing a metal element that is the same as the doped metal element is disposed on a surface of the core active material. For example, the nanostructure including the metal borate compound containing the metal element, which is the same as the doped metal element, is grown on the surface of the core active material at the same time when the core active material is doped with the boron and the metal element. The simultaneous doping of the core active material and the formation of the nanostructure occurs by a one-step process during preparation of an electrode active material. Without being limited by theory, it is understood that the nanostructure disposed on the surface of the core active material may have an increased surface area in contact with a current collector and/or between adjacent electrode active material particles, and thus may have improved bonding strength between the current collector and the electrode active material and/or between the electrode active material particles. Also, when the nanostructure is disposed on a surface of the core active material, bending durability of an energy storage device may improve. Further, it is also understood that when HF is produced by a side reaction between the core active material and an electrolyte, $H^+$ is removed from HF by a hydrogen bond with the metal element included in the nanostructure, and thus an amount of the HF side-reaction product, is decreased, which may result in an improvement in the lifespan characteristics of the energy storage device.

The core active material may be a positive active material or a negative active material, each capable of reversibly incorporating and deincorporating lithium, and any such core active material may be used. The core active material will be described later.

A dopant is included in the core active material, and the dopant includes boron and a metal element. The core active material has a layered structure in which boron and the metal element are doped, and the metal element may be inserted in the layered structure of the core active material and may simultaneously form a nanostructure on a surface of the core active material. The nanostructure may be a one-dimensional nanostructure, a two-dimensional nanostructure, a three-dimensional nanostructure, or a combination thereof.

The metal element is a material which is capable of contracting or expanding the layered structure of the core active material. The metal element may include aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), gold (Au), or a combination thereof. Without being limited by theory, it is believed that in the case of the doping (e.g. hetero-doping) of the core active material with boron and the metal element, when the interlayer spacing of the layered structure of the core active material is reduced as compared to the core active material before doping, stable electrochemical characteristics may be obtained in the repeated charging/discharging process due to the increase in the bonding force between the doped metal element and surrounding oxygen. It is also believed that when the interlayer spacing of the layered structure of the core active material is increased as compared to the core active material before doping, the movement of lithium ions is facilitated and thus, structural deformation due to lithium deincorporation/emptying inside of the active material may be prevented.

According to an embodiment, the dopant may further include lithium (Li). When an excessive lithium source is added in the process of manufacturing an electrode active material, a lithium (Li) element may be further doped into the layered structure of the core active material. When a lithium (Li) element is further doped to the core active material, additional contraction or expansion of the layered structure of the core active material may occur.

The doped boron and metal element may be doped as a pair in the layered structure of the core active material. For example, the boron and metal element may pair and be inserted in a lithium layer of the core active material. For example, the boron and metal element may pair and form an oxidation state with the surrounding oxygen element. As used herein, the term "pair" or "pairing" refers to a relationship between at least two elements, e.g., the boron and the metal element, in which the elements are linked together or are directly associated one another such that the presence of one element assumes the presence of the other element.

The boron and metal element may be doped in the core active material while being in a pair, or may be doped in the form of, for example, $AlB$, $Al_4B_2$, $Al_5B$, $Al_{18}B_4$, $ZrB$, $ZrB_2$, $ZrB_3$, $ZrB_4$, a lithium-containing material thereof, or a combination thereof.

The total amount of boron and metal elements, i.e. the boron and the first metal element in the dopant, and boron and the second metal element contained in the metal borate compound disposed on a surface of the core active material, may be in a range of about 0.3 mole percent (mol %) to about 10 mol %, based on 1 mole of the core active material. For example, the total amount of boron and metal element may be in a range of about 0.35 mol % to about 5 mol % based on 1 mol of the core active material. For example, the total amount of boron and metal element may be in a range of about 0.375 mol % to about 1 mol % based on 1 mol of the core active material. Within these ranges, the layered structure of the core active material is stabilized and thus a long lifespan may be obtained.

The total amount of the metal elements, i.e. the first metal element in the dopant and the second metal element contained in the metal borate compound, may be about 0.25 mol % or greater based on 1 mol of the core active material. For example, the total amount of the metal elements may be about 0.3 mol % or greater based on 1 mol of the core active material. The total amount of the metal elements may be about 0.375 mol % or greater based on 1 mol of the core active material. The total amount of the metal elements may be about 0.4 mol % or greater based on 1 mol of the core active material. Within the above ranges, the doping and coating effect of boron and the metal element with respect to the core active material may be obtained. The remainder of the total amount of boron and metal elements is the total amount of boron, i.e. boron in the dopant and boron contained in the metal borate compound.

In an embodiment, a molar ratio of the total amount of the metal elements (i.e. the first metal element in the dopant and the second metal element contained in the metal borate compound) to the total amount of boron in the dopant and boron contained in the metal borate compound (hereinafter it is referred to as "the molar ratio of the metal elements to boron") may be in a range of about 1:10 to about 30:1. For example, the molar ratio of the metal elements to boron may be in a range of about 1:5 to about 15:1, or, for example, in a range of about 1:2 to about 5:1. Within the above ranges, some of the metal element and boron may be doped in the layered structure of the core active material, and the remaining metal element and boron may form a nanostructure including the metal borate compound on a surface of the core active material.

Due to a hetero-doping of boron and the metal element in the core active material, the interlayer distance of the layered structure of the core active material may be increased as compared to the interlayer distance before the doping, and without being limited by theory, it is understood that the corresponding lattice distortion leads to a stable lattice structure, thereby stabilizing the structure of the core active material. Accordingly, charging and discharging of lithium ions may continue stably, and the lifetime characteristics of the lithium secondary battery may be improved.

The electrode active material may further include a nanostructure disposed on a surface of the core active material and including a metal borate compound including a metal element, which is the same metal element as the doped metal element. The nanostructure may coat the surface of the core active material.

The nanostructure including the metal borate compound and disposed on the surface of the core active material may have an increased surface area in contact with a current collector and/or between adjacent electrode active material particles and thus may facilitate increased bonding strength between the current collector and the electrode active material particles and/or between the electrode active material particles. In addition, without being limited by theory, the electrode active material having the nanostructure on its surface may improve the bending durability of an energy storage device including the electrode active material. It is also understood that the nanostructure containing the metal borate compound may provide an energy storage device having improved lifetime characteristics, since there may be a reduction in the amount of HF generated by a side reaction between the core active material and an electrolyte. The reduction in HF is due to the formation of a hydrogen bond with the metal element contained in the nanostructure, and thus, $H^+$ is removed from HF, leading to a decrease in an amount of HF.

In an embodiment, the nanostructure has a shape having a one- or higher dimensional structure, e.g., a one-dimensional nanostructure, a two-dimensional nanostructure, a three-dimensional nanostructure, or a combination thereof. The nanostructure may include a nanowire, a nanorod, a nanoplate, a nanobelt, a nanoribbon, or a combination thereof. For example, the nanostructure may be a nanorod, a nanowire, a nanoplate, or a combination thereof.

The term "nanowire" as used herein refers to a wire-like material having a diameter on a nanoscale level, meaning that the length is not limited, and the aspect ratio is about 100 or greater. The term "nanorod" refers to a material having a rod shape and having a diameter on a nanoscale level, and which is larger in diameter and shorter in length than the nanowire and has an aspect ratio of less than about 100. The term "nanoplate" refers to a 2-dimensional flat plate having a thickness on a nanoscale level. The term "nano-belt" refers to a belt having both a thickness and a width on a nanoscale level. The term "nanoribbon" refers to a ribbon having a width on a nanoscale level, and an aspect ratio of about 10 or greater.

In an embodiment, the aspect ratio of the nanostructure may be in a range of about 1 to about 200. The aspect ratio of the nanostructure may be, for example, in a range of about 1 to about 100, and may be, for example, in a range of about 1 to about 50, for example, about 1 to about 30, and may be, for example, in a range of about 5 to about 20. The nanostructure having the above-described aspect ratio may be disposed on the surface of the core active material, and may further improve the binding force between the electrode active material and a current collector and/or between electrode active material particles.

The metal borate compound constituting the nanostructure may be a compound represented by the following general Formula 1.

$$M_xB_yO_z \hspace{2cm} \text{Formula 1}$$

In Formula 1, M is a material capable of contracting or expanding the layered structure of the core active material, and is aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), gold (Au), or a combination thereof; and x, y, and z satisfy $1 \leq x < 30$, $1 \leq y < 10$, and $1 < z < 40$.

In some embodiments, M may be aluminum (Al), zirconium (Zr), or a combination thereof.

For example, x, y, and z in Formula 1 may satisfy the conditions of $1 \leq x < 20$, $1 \leq y < 5$, and $1 < z < 35$.

In an embodiment, the metal borate compound may be a compound additionally including lithium (Li).

For example, the metal borate compound constituting the nanostructure may be a compound represented by Formula 2:

$$mMO_\beta \text{-} nB_2O_3 \hspace{2cm} \text{Formula 2}$$

In Formula 2, M is a material capable of contracting or expanding the layered structure of the core active material, and is aluminum (Al), zirconium (Zr), calcium (Ca), barium (Ba), bismuth (Bi), tin (Sn), zinc (Zn), silicon (Si), strontium (Sr), titanium (Ti), vanadium (V), chromium (Cr), iron (Fe), copper (Cu), niobium (Nb), molybdenum (Mo), ruthenium (Ru), palladium (Pd), silver (Ag), cadmium (Cd), tantalum (Ta), tungsten (W), iridium (Ir), platinum (Pt), gold (Au), or a combination thereof; β is a number that is determined by an oxidation state of M; and m:n may be in a range of about 0.5:0.5 to about 9:2.

In an embodiment, the metal borate compound may be a compound additionally including lithium (Li).

In an embodiment, the metal borate compound may be an aluminum borate compound, a zirconium borate compound, a Li-containing compound thereof, or a combination thereof.

In an embodiment, the aluminum borate compound may include $AlBO_3$, $Al_4B_2O_9$, $Al_5BO_9$, $Al_{18}B_4O_{33}$, a Li-containing compound thereof, or a combination thereof. For example, the aluminum borate compound may include $Al_5BO_9$, $Al_{18}B_4O_{33}$, or a combination thereof. $Al_5BO_9$ may be represented by $5Al_2O_3 \cdot B_2O_3$, and $Al_{18}B_4O_{33}$ may be represented by $9Al_2O_3 \cdot 2B_2O_3$. For example, the boron-doped alumina may be $Al_{18}B_4O_{33}$ having an orthorhombic crystal structure, or may be a Li-containing compound.

In an embodiment, the zirconium borate compound may include $ZrBO_3$, $ZrB_2O_5$, $LiZrB_3O_7$, $Li_2ZrB_4O_9$, a Li-containing compound thereof, or a combination thereof. For example, the zirconium borate compound may include $ZrB_2O_5$, a Li-containing compound thereof, or a combination thereof.

The boron and metal element doped in the core active material may be formed of a compound having the same composition as the metal borate compound constituting the nanostructure coated on the surface of the core active material. For example, the compound may form an oxide having the same composition.

In an embodiment, when the raw material of the aluminum borate compound doped in the core active material is used in a an amount that is greater than the desired doping amount, the nanostructure including the aluminum borate compound grows on the surface of the core active material.

In another embodiment, the boron and metal element doped in the core active material may be formed of a compound having a composition different from that of the metal borate compound constituting the nanostructure.

The core active material will be described below.

The core active material may be a positive active material or a negative active material, each capable of reversibly incorporating and deincorporating lithium, and may be any material suitable for use as a positive or negative active material. In an embodiment, the core active material may include a lithium metal oxide, a lithium metal composite oxide, a metal oxide, a metal composite oxide, a carbonaceous material, silicon, silicon oxide, tin, tin oxide, or a combination thereof.

In an embodiment, a positive active material for use as the core active material may include, for example, a compound represented by any one formula of $Li_aA_{1-b}B'_bD_2$ (where $0.90 \leq a \leq 1.8$ and $0 \leq b \leq 0.5$), $Li_aE_{1-b}B'_bO_{2-c}D_c$ (where $0.90 \leq a \leq 1.8$, $0 \leq b \leq 0.5$, $0 \leq c \leq 0.05$), $LiE_{2-b}B'_bO_{4-c}D_c$ (where $0 \leq b \leq 0.5$, $0 \leq c \leq 0.05$), $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha < 2$), $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD_\alpha$ (where $0.90 \leq a \leq 1.8$, $0 \leq b \leq 0.5$, $0 \leq b \leq 0.5$, $0 \leq c \leq 0.05$, and $0 < \alpha \leq 2$), $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$ and $0.001 \leq b \leq 0.1$.); $Li_aCoG_bO_2$ (where $0.90 \leq a \leq 1.8$ and $0.001 \leq b \leq 0.1$.); $Li_aMnG_bO_2$ (where $0.90 \leq a \leq 1.8$ and $0.001 \leq b \leq 0.1$.); $Li_aMn_2G_bO_4$ (where $0.90 \leq a \leq 1.8$ and $0.001 \leq b \leq 0.1$.), $QO_2$, $QS_2$; $LiQS_2$; $V_2O_5$, $LiV_2O_5$; $LiI'O_2$, $LiNiVO_4$; $Li_{(3-f)}J_2(PO_4)_3(0 \leq f \leq 2)$, $Li_{(3-f)}Fe_2(PO_4)_3(0 \leq f \leq 2)$, $LiFePO_4$, or a combination thereof.

In the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

In an embodiment, the positive active material including the layered structure may include, for example, $LiCoO_2$, $LiNiO_2$, $LiMnO_2$, $LiMn_2O_4$, $Li(Ni_aCo_bAl_c)O_2$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $Li(Ni_aCo_bMn_c)O_4$ (where $0<a<2$, $0<b<2$, $0<c<2$, and $a+b+c=2$), $LiMn_{2-z}Ni_zO_4$, $LiMn_{2-z}Co_zO_4$ (where $0<Z<2$), $LiCoPO_4$, $LiFePO_4$, $LiFePO_4$, $V_2O_5$, TiS, MoS, or a combination thereof.

In an embodiment, the core active material may include a positive active material having a layered structure. As the positive active material having a layered structure, a lithium metal oxide represented by Formula 3 may be used.

$LiNi_xM^1_{1-x}O_{2-e}M'_e$   Formula 3

In Formula 3, $M^1$ is a Group 4 to Group 14 element; M' is an anion element including F, S, CL, Br, or a combination thereof; $0.7 \leq x<1$; and $0 \leq e<1$.

When a nickel-enriched lithium nickel oxide is used as the positive electrode active material as shown in Formula 3, a lithium secondary battery having a high output and a high capacity may be produced.

$M^1$ in Formula 3 may include manganese (Mn), vanadium (V), chromium (Cr), iron (Fe), cobalt (Co), zirconium (Zr), rhenium (Re), boron (B), germanium (Ge), ruthenium (Ru), tin (Sn), titanium (Ti), niobium (Nb), molybdenum (Mo), platinum (Pt), or a combination thereof.

The compound represented by Formula 3 may be, for example, a compound represented by Formula 4:

$LiNi_xCo_yMn_zM^3_cO_{2-e}M'_e$.   Formula 4

In Formula 4, $0.7 \leq x \leq 0.99$, $0 \leq y<1$, $0<z<1$, $0 \leq c<1$, $x+y+z+c=1$, $0 \leq e<1$, M3 may include a Group 4 to Group 14 element, and M' may include an anion element including F, S, Cl, Br, or a combination thereof.

In an embodiment, in Formula 4, an amount of cobalt may be greater than an amount of manganese (y>z). When an amount of cobalt is greater than that of manganese, the conductivity and the capacity of a lithium secondary battery having a positive electrode using the positive active material may be improved.

The compound represented by Formula 3 may be, for example, a compound represented by Formula 5:

$LiNi_xCo_yMn_zO_2$   Formula 5

In Formula 5, x, y, and z satisfy the conditions of $0.7 \leq x \leq 0.99$, $0<y<1$, $0<z<1$, and $x+y+z=1$.

In an embodiment, the positive active material having a layered structure may be a metal oxide represented by Formula 6.

$A_2M^2O_3$   Formula 6

In Formula 6, A includes a Group 1 to Group 3 element, or a combination thereof, and $M^2$ includes a Group 2 to a Group 16 element, a rare earth element, or a combination thereof.

A in Formula 6 may include Li, Na, La, Sr, Ba, H, K, Y, or a combination thereof. $M^2$ in Formula 6 may include Al, Ga, Ge, Mg, Nb, Zn, Cd, Ti, Co, Ni, Mn, Ca, Si, Fe, Cu, Sn, V, B, P, Se, Bi, As, Zr, Re, Ru, Cr, Sr, Sc, Y, or a combination thereof.

Examples of the compound having a layered crystal structure represented by Formula 6 include $Li_2MnO_3$, $Li_2TiO_3$, $Li_2SnO_3$, $Li_2ZrO_3$, $Li_2MoO_3$, and $Li_2RuO_3$.

In an embodiment, the negative active material that may be used as the core active material includes, for example, a lithium metal, a metal capable of alloying with lithium, a transition metal oxide, a material capable of doping and undoping lithium, a material reversibly enabling incorporation and deincorporation of lithium, or a combination thereof.

Non-limiting examples of the transition metal oxide may include tungsten oxide, molybdenum oxide, titanium oxide, lithium titanium oxide, vanadium oxide, lithium vanadium oxide, or the like, or a combination thereof.

Examples of the material capable of doping and undoping lithium include Si, $SiO_x$ ($0<x \leq 2$), an Si—Y' alloy (Y' is alkali metal, alkali earth metal, a Group 13 element, a Group 14 element, a Group 15 element, a Group 16 element, transition metal, rare earth element, or a combination thereof, and is not Si), Sn, $SnO_2$, an Sn—Y' alloy (Y' is alkali metal, alkali earth metal, a Group 13 element, a Group 14 element, a Group 15 element, a Group 16 element, transition metal, a rare earth element, or a combination thereof, and is not Sn), a combination of $SiO_2$ and at least one of the foregoing, or a combination thereof. The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The material reversibly enabling incorporation and deincorporation of lithium ions may be a carbonaceous material. The carbonaceous material may be any carbonaceous negative active material that is suitable for use in a lithium secondary battery. For example, the carbonaceous material may be crystalline carbon, amorphous carbon, or a mixture thereof. Non-limiting examples of the crystalline carbon include flaky, flake, spherical or fibrous natural graphite. Non-limiting examples of the amorphous carbon include soft carbon or hard carbon, mesophase pitch carbonization products, fired coke, and the like.

In an embodiment, the negative active material may include an active material that embodies high capacity, such as a silicon-containing active material such as Si, $SiO_x$ (0<x≤2), or a Si—Y alloy; a tin-containing active material such as Sn, $SnO_2$, or a Sn—Y alloy; a silicon-tin active material; or a silicon-carbon active material. A combination comprising at least two of the foregoing may also be used.

In an embodiment, the negative active material used as the core active material may include a carbonaceous material having a layered structure. Such carbonaceous materials include crystalline carbon having a layered structure.

The term "crystalline" as used herein refers to a case in which the structure includes at least about 50 weight percent (wt %) of a hexagonal crystal lattice structure in which three carbon atoms are covalently bonded to the carbon atom having a $sp^2$ hybrid orbital. In an embodiment, a crystalline carbon material may include about 60 wt %, about 70 wt %, about 80 wt %, or about 90 wt % of crystalline carbon, or about 100 wt % crystalline carbon. The hexagonal crystal lattice structure may have a single layer or a multi-layer structure. The hexagonal crystal lattice structure may include, based on a two-dimensional shape, a deformation such as warping, curling, and partial deflection, and may be connected to form a soccer-ball shape. The crystal structure of the carbonaceous material is not limited as long as it reversibly incorporates or deincorporates lithium ions during charging and discharging.

In an embodiment the crystalline carbon may include natural graphite, artificial graphite, expanded graphite, graphene, carbon black, fullerene soot, or a combination thereof, but examples thereof are not limited thereto.

Natural graphite is naturally produced graphite, and examples thereof include flake graphite, high crystalline graphite, and microcrystalline or cryptocrystalline (amorphous) graphite. Artificial graphite is artificially synthesized graphite, which is made by heating amorphous carbon at a high temperature, and examples thereof include primary or electrographite, secondary graphite, and graphite fiber. Expanded graphite is prepared by intercalation and heating of chemical substances, such as an acid or an alkali, in between layers of graphite to inflate the vertical layer of a molecular structure. Graphene refers to a single layer or multiple layers of graphite. Carbon black is a crystalline material having a less regular structure than graphite. When carbon black is heated at about 3,000° C. for a long time, it may be transformed into graphite. The fullerene soot is a carbon mixture including at least 3% by weight of fullerene, which is a polyhedral compound consisting of 60 or more carbon atoms. These types of crystalline carbon may be used as the carbonaceous material, either alone, or in combination. For example, natural graphite or artificial graphite may be used because mixture density may be easily raised when a negative electrode is manufactured.

The carbonaceous material may have a shape in the form of a sphere, a platelet, a fiber, a tube, or a powder. For example, the carbonaceous material may have a spherical or platelet shape.

The carbonaceous material may have an oxygen-containing functional group such as —OH, —COOH, or a polymeric substituent such as PEO or PEG, on a surface thereof. The carbonaceous material may include a fluorine-containing organic polymer coating layer on a surface thereof. Nano-metal particles or nano-metalloid particles may be added to the carbonaceous material, or a tin salt, a cobalt salt, or an iron salt may be mixed with the carbonaceous material.

The core active material may be, a single particle (primary particle), or may be a secondary particle formed of agglomerated primary particles (a plurality of primary particles). The secondary particle may include gaps and boundaries between the primary particles. The secondary particle may have a greater capacity than a primary particle due to the increased specific surface area. The nanostructure that includes the metal borate may be disposed on a surface of the secondary particle, a surface of the primary particle, a grain boundary between the primary particles, or a combination thereof.

The average particle size of the secondary particles of the core active material is not particularly limited. However, when the average particle size of the core active material is too small, the reactivity thereof with an electrolytic solution is high and the cycle characteristics thereof may be deteriorated. When the average particle size of the core active material is too large, the dispersion stability of the core active material during the preparation of the electrode slurry may deteriorate and the surface of an electrode may be roughened. The average particle size (D50 particle size) of the core active material may be about 50 micrometers (µm) or less, for example, in a range of about 1 µm to about 30 µm, about 5 µm to about 25 µm, or about 10 µm to about 20 µm.

The "average particle size" or "D50 particle size" means a particle diameter corresponding to 50% of the total particles in a distribution curve in which particles are accumulated from the smallest particle to the largest particle, and the total number of particles is set as 100%. The D50 particle size may be measured by using methods known to those of skill in the art, for example, a particle size analyzer, or by transmission electron microscope (TEM) or SEM photographs. As another method, for example, the average particle size may be measured using a dynamic light-scattering measuring device to count the number of particles having a predetermined size range. Once the number of particles is counted for every size range, the average particle diameter may be easily obtained by performing data analysis and calculating an average particle diameter.

The core active material having a layered structure including the dopant (boron and the metal element) may have an interlayer distance which is longer or shorter than an interlayer distance of the layered structure of the core active material without the dopant. In an embodiment, an interlayer distance of the layered structure of the core active material with the dopant is increased as compared to an interlayer distance of the layered structure of the core active material without the dopant. In another embodiment, an interlayer distance of the layered structure of the core active material with the dopant is decreased as compared to an interlayer distance of the layered structure of the core active material without the dopant. The increase or decrease in the interlayer distance may be confirmed by a peak shift as measured by x-ray diffraction (XRD) analysis.

In this regard, the electrode active material, in which doping and coating are simultaneously performed, may exhibit excellent capacity and cycle characteristics.

In an embodiment, the electrode active material may contain residual lithium in an amount in a range of about 100 parts per million (ppm) to about 20,000 ppm. For example, the electrode active material may contain residual lithium in an amount in a range of about 2,000 ppm to about 8,000 ppm, or in a range of about 2,000 ppm to about 7,000 ppm. When an amount of the residual lithium is within these ranges, the electrode active material may have a complete layered structure.

In the electrode active material, an amount of the residual lithium may vary before and after the washing of the electrode active material during the preparation process. For example, when the electrode active material is obtained after heat-treatment during the preparation process, an amount of the residual lithium may be in a range of about 1,000 ppm to about 20,000 ppm, and, after the electrode active material is additionally washed, an amount of the residual lithium may be in a range of about 100 ppm to about 5,000 ppm. When the amount of the residual lithium is within these ranges, the electrode active material may have a complete layered structure.

Another aspect of the present disclosure provides a method of preparing the electrode active material.

The method for preparing the electrode active material is not particularly limited, but may be produced by using a dry method according to an embodiment.

In an embodiment, a method of preparing the electrode active material includes:

dry-mixing a precursor material for the core active material, a metal element precursor, and a borate precursor to prepare a mixture; and heat-treating the mixture to prepare the electrode active material.

The precursor material for the core active material may be any material that is capable of being dry mixed and transformed into the core active material by the heat treatment. For example, when the precursor material for the core active material is in the form of a hydrate, since the precursor material self sol-gel reacts, it may be dry mixed with a metal element precursor and a borate precursor.

The metal element precursor may be in the form of a hydrate. The metal element precursor in the hydrate form may facilitate the dry process. The metal element precursor comprises an aluminum precursor, a zirconium precursor, a hydrate thereof, or a combination thereof.

The aluminum precursor may include, for example, $Al(NO_3)_3$, $Al_2O_3$, $AlPO_4$, $Al(OH)_3$, $Al(ClO_4)_3$, $AlK(SO_4)_2$, $Al_2(SO_4)_3$, $Al_2S_3$, $AlF_3$, a hydrate thereof, or a combination thereof.

The zirconium precursor may include $Zr(NO_3)_4$, $ZrO_2$, $Zr(HPO_4)_2$, $Zr(OH)_4$, $Zr(ClO_4)_4$, $Zr(SO_4)_2$, $(CH_3CO_2)_xZr(OH)_y$ (where x+y=4), $ZrCl_4$, $ZrF_4$, a hydrate thereof, or a combination thereof.

The borate precursor may include a borohydride compound. The borohydride compound may include $H_3BO_3$, $LiBH_4$, $NaBH_4$, $KBH_4$, $Mg(BH_4)_2$, $Ca(BH_4)_2$, $Sr(BH_4)_2$, $NH_3BH_3$, $Al(BH_4)_3$, or a combination thereof.

The amounts of the metal element precursor and the borate precursor may be determined so as to fall within such a range that the mole ratio of the metal element to B is about 1:10 to about 30:1.

When the borate precursor contains lithium, additional Li precursor may be added to the mixture for meeting the required amount of a lithium precursor.

However, if desired, for example, even when the borate precursor does not contain lithium, or when it is desirable to control the amount of lithium in the core active material, the mixture may include the Li precursor.

The Li precursor may be, for example, a lithium salt, such as lithium nitrate ($LiNO_3$), lithium acetate ($CH_3COOLi$), lithium carbonate ($Li_2CO_3$), lithium hydroxide (LiOH), or a combination thereof. The amount of lithium in the core active material may be controlled by using the lithium salt.

The dry mixing of the precursor materials may be performed by ball milling. A type of ball usable for the ball milling may be, for example, a zirconia ball, however the type of ball is not limited, and the size of the ball may be, for example, about 0.3 millimeters (mm) to about 10 mm, but is not limited thereto.

The ball milling may be carried out for about 4 hours to about 48 hours, or for about 4 hours to about 20 hours, or for about 6 hours to about 18 hours, for example. Various methods other than the ball milling may be used as long as the reactants can be uniformly mixed.

Thereafter, the mixture is heat-treated to obtain an electrode active material doped with boron and a metal element (e.g., an aluminum borate compound) in the core active material.

The heat treatment may be carried out, for example, in ambient air or under an oxygen-containing atmosphere at a temperature range of about 600° C. to about 1,000, or about 650° C. to about 950° C., or about 700° C. to about 900° C. Under an atmosphere where oxygen is supplied, the aluminum precursor and the borate precursor may be converted into an aluminum borate compound, which is doped in the core active material.

In an embodiment, the method may further include washing the electrode active material obtained after the heat-treating of the mixture. The washing may include washing the electrode active material using water. An amount of the residual lithium remaining in the electrode active material may be controlled by this washing process, and thus characteristics of a lithium secondary battery may be controlled. The washing process may remove the residual lithium present in the core active material and on the surface by inducing chemical dissolution and physical desorption.

For example, an amount of the residual lithium of the electrode active material before the washing may be in a range of about 1,000 ppm to about 20,000 ppm, or in an amount in a range of about 2,000 ppm to about 8,000 ppm, or in a range of about 2,000 ppm to about 7,000 ppm. The amount of the residual lithium of the electrode active material after the washing may be reduced to a range of about 100 ppm to about 5,000 ppm, or about 100 ppm to about 4,000 ppm, or about 100 ppm to about 3,000 ppm. For example, an amount of the residual lithium in the electrode active material after the washing may be in a range of about 1,000 ppm to about 2,000 ppm. In this regard, the controlled amount of residual lithium may lead to the improvement in the lifespan characteristics by removing the residual lithium present on the core active material and the surface for easy incorporation and deincorporation of lithium ions, and accordingly, the inhibition of a side reaction with the electrolyte may result in enhancement of the stability of the lithium secondary battery.

By such a method of preparing an electrode active material, an electrode active material having excellent capacity and life characteristics may be obtained.

Lithium Secondary Battery

Another aspect of the present disclosure provides a lithium secondary battery including an electrode including the electrode active material.

The electrode active material, including the core active material, may be used in a positive electrode, a negative electrode, or a combination thereof.

The lithium secondary battery may include a positive electrode; a negative electrode disposed opposite to the positive electrode; and an electrolyte between the negative electrode and the positive electrode.

In an embodiment, the positive electrode may be prepared by mixing a positive active material, a conductive agent, and a binder in a solvent to prepare a positive active material composition, and either molding the positive active material into a certain desired shape, or coating the positive active material composition on a current collector such as a copper foil.

The positive active material may include the electrode active material including a positive active material as the core active material. In an embodiment, the positive active material may be any suitable material that is used in the art. For example, the above-described positive active materials may be used as a core active material. In an embodiment, the electrode active material may be mixed with a general positive active material.

The conductive agent used in the positive active material composition may provide a conductive path to the positive active material to facilitate electrical conductivity. The conductive agent may be any material that is suitable for use in a lithium battery. Examples of the conductive agent are carbonaceous materials such as carbon black, acetylene black, Ketjen black, and carbon fibers (e.g., vapor-grown carbon fiber); a metal powder or a metal fiber of copper, nickel, aluminum, or silver; a conductive polymer such as a polyphenylene derivative, or a conductive material including a mixture thereof. The amount of the conductive agent may be appropriately adjusted. For example, the weight ratio of the positive active material to the conductive agent may be in the range of 99:1 to 90:10.

The binder used in the positive active material composition is a component that assists in bonding between the positive active material and the conductive agent and bonding between the positive active material and the current collector. The binder may be added in an amount of about 1 part by weight to about 50 parts by weight based on 100 parts by weight of the positive active material. For example, the binder may be added in an amount of about 1 part by weight to about 30 parts by weight, about 1 part by weight to about 20 parts by weight, or about 1 part by weight to about 15 parts by weight based on 100 parts by weight of the positive active material. Examples of the binder include polyvinylidene fluoride, polyvinylidene chloride, polybenzimidazole, polyimide, polyvinyl acetate, polyacrylonitrile, polyvinyl alcohol, carboxymethylcellulose (CMC), starch, hydroxypropyl cellulose, regenerated cellulose, polyvinylpyrrolidone, polyethylene, polypropylene, polystyrene, polymethyl methacrylate, polyaniline, acrylonitrile butadiene styrene copolymer, a phenolic resin, an epoxy resin, polyethylene terephthalate, polytetrafluoroethylene, polyphenylene sulfide, polyamideimide, polyetherimide, polyethylene sulfone, polyamide, polyacetal, polyphenylene oxide, polybutylene terephthalate, ethylene-propylene-diene terpolymer (EPDM), sulfonated EPDM, styrene butadiene rubber, a fluorinated rubber, copolymers thereof, or a combination thereof.

As the solvent, N-methylpyrrolidone (NMP), acetone, water, and the like, or a combination thereof, may be used. The amount of the solvent may be 1 to 100 parts by weight based on 100 parts by weight of the positive active material. When the amount of the solvent is within the range above, an active material layer may be easily formed.

The current collector may have a thickness in a range of about 3 μm to about 500 μm. As the current collector, any suitable material may be used as long as it has electrical conductivity and does not cause a chemical change in a corresponding battery. Examples of a positive current collector include copper, stainless steel, aluminum, nickel, titanium, calcined carbon, or copper or stainless steel that is surface treated with carbon, nickel, titanium, or silver, and an aluminum-cadmium alloy. The current collector may have a fine uneven structure at its surface to increase a binding force with respect to the positive active material. The current collector may have various shapes, such as film, sheet, foil, net, porous, foam, or a non-woven shape.

The positive active material composition thus prepared may be coated directly on the current collector to prepare a positive electrode plate. Alternatively, a positive electrode active material film may be obtained by casting the positive active material composition on a separate support, and peeling the film from the support, and laminating the film on a copper foil current collector to obtain a positive electrode plate. The positive electrode is not limited to the above-described form, but may be in a form other than the above-described form.

Separately, a negative active material, a binder, a solvent, and a conductive agent, which is optional, are mixed to prepare a negative active material composition.

The negative active material may include the above-described electrode active material using a negative active material as a core active material. In an embodiment, the negative active material may be any material that is suitable for use in the art. In an embodiment, the electrode active material may be used after mixing with a general negative active material.

In addition to the electrode active material, non-limiting examples of the negative electrode active material commonly used in the art are lithium metal, a metal capable of alloying with lithium, a transition metal oxide, a material capable of doping and undoping lithium, and a material reversibly enabling incorporation and deincorporation of lithium ions.

Non-limiting examples of the transition metal oxide may include tungsten oxide, molybdenum oxide, titanium oxide, lithium titanium oxide, vanadium oxide, lithium vanadium oxide, and the like, or a combination thereof.

Examples of the material capable of doping and undoping lithium include Si, $SiO_x(0<x<2)$, a Si—Y' alloy (Y' is alkali metal, alkali earth metal, a Group 13 element, a Group 14 element, a Group 15 element, a Group 16 element, transition metal, rare earth element, or a combination thereof, and is not Si), Sn, $SnO_2$, a Sn—Y' alloy (Y' is alkali metal, alkali earth metal, a Group 13 element, a Group 14 element, a Group 15 element, a Group 16 element, transition metal, a rare earth element, or a combination of these, and is not Sn), a combination of $SiO_2$, and at least one of these, or a combination thereof. The element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The material reversibly enabling incorporation and deincorporation of lithium ions may be a carbonaceous material.

The carbonaceous material available herein may be any carbonaceous anode active material that is used in a lithium battery. For example, the carbonaceous material may be crystalline carbon, amorphous carbon, or a mixture thereof. Non-limiting examples of the crystalline carbon include flaky, flake, spherical or fibrous natural graphite. Non-limiting examples of the amorphous carbon include soft carbon or hard carbon, mesophase pitch carbonization products, fired coke, and the like.

The conductive agent, the binder, and the solvent in the negative active material composition may be the same as those of the above-mentioned positive electrode active material composition. In some cases, a plasticizer may be further added to the positive active material composition and the negative active material composition to form pores inside an electrode plate. The amounts of the negative active material, the conductive agent, the binder, and the solvent may be determined by those of skill in the art without undue experimentation.

For use as a negative current collector, the material is not particularly limited as long as it has high conductivity without causing a chemical change in a corresponding battery. The negative current collector may have a thickness in a range of about 3 μm to about 500 μm. Examples of the negative current collector include stainless steel, aluminum, nickel, titanium, calcined carbon, and aluminum or stainless steel surface-treated with carbon, nickel, titanium, silver, or the like. The current collector may have a fine uneven structure at its surface to increase a binding force with respect to the negative active material. The current collector may have various shapes, such as film, sheet, foil, net, porous, foam, or non-woven shape.

The prepared negative active material composition may be directly coated on the negative collector and dried to produce a negative electrode plate. In an embodiment, the negative active material composition may be cast on a separate support, and then a film obtained by peeling from the support may be laminated on the negative current collector to produce a negative electrode plate.

The positive electrode and the negative electrode may be separated from one another by a separator, and the separator may be any separator that is suitable for use in a lithium battery. In particular, the separator may have a low resistance against the ion movement of an electrolyte and an excellent ability to impregnate the electrolyte. For example, the separator may include glass fiber, polyester, Teflon, polyethylene, polypropylene, polytetrafluoroethylene (PTFE), or combination thereof which may be used in the form of a nonwoven fabric or a woven fabric. The separator may have a pore diameter in a range of about 0.01 μm to about 10 μm and a thickness in a range of about 5 μm to about 300 μm.

A non-aqueous electrolyte containing a lithium salt may include a non-aqueous electrolyte and a lithium salt. Examples of the non-aqueous electrolyte include a non-aqueous solvent, an organic solid electrolyte, and an inorganic solid electrolyte.

Examples of the non-aqueous solvent include an aprotic organic solvent, such as N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydrofuran, 2-methyl tetrahydrofuran, dimethylsulfoxide, 1,3-dioxorane, formamide, dimethylformamide, dioxolane, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, a tetrahydrofuran derivative, ether, methyl propionate, ethyl propionate, or a combination thereof.

Examples of the organic solid electrolyte include a polyethylene derivative, a polyethylene oxide derivative, a polypropylene oxide derivative, a phosphate ester polymer, poly-l-lysine, polyester sulfide, polyvinyl alcohol, polyvinylidene fluoride, a polymer including an ionic dissociation group, and the like, or a combination thereof.

Examples of the inorganic solid electrolyte include a nitride, a halide, and a sulfate of Li, such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, and $Li_3PO_4$—$Li_2S$—$SiS_2$, or a combination thereof.

The lithium salt may be any material that is suitable for use in a lithium battery, and a material that is dissolved in the non-aqueous electrolyte. The lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, lithium tetraphenylborate, lithium imide, or a combination thereof.

According to the separator and electrolyte used, the lithium battery may be classified as a lithium ion battery, a lithium ion polymer battery, and a lithium polymer battery. According to the shape, the lithium battery may be classified as a cylindrical shape lithium battery, a rectangular shape lithium battery, a coin shape lithium battery, and a pouch shape lithium battery. According to the size, the lithium battery may be classified as a bulk type and a thin film type.

Methods of manufacturing these lithium secondary batteries are well known in the art, and detailed description thereof will be omitted.

FIG. 1 is a schematic view of a structure of a lithium secondary battery 30 according to an embodiment.

Referring to FIG. 1, the lithium secondary battery 30 includes a positive electrode 23, a negative electrode 22, and a separator 24 between the positive electrode 23 and the negative electrode 22. The positive electrode 23, the negative electrode 22 and the separator 24 are wound or folded and placed in a battery case 25. Then, an electrolyte is injected into the battery case 25 and sealed with a sealing member 26 to complete the lithium battery 30. The battery case 25 may be a cylindrical type, a rectangular type, or a thin-film type.

The lithium secondary battery may be used not only as a power source for a small device such as a conventional cell phone or a portable computer, but also as a unit battery for a middle- or large-sized device battery module including a plurality of batteries.

Examples of a mid- to large-sized device include a power tool; an xEV including an electric vehicle (EV), a hybrid electric vehicle (HEV), and a plug-in hybrid electric vehicle (PHEV); an electric bicycle including an E-bike and an E-scooter; an electric golf cart; an electric truck; an electric commercial vehicle; and a system for power storage, but are not limited to these. In addition, the lithium secondary battery may be used for all other applications requiring high output, high voltage, and high-temperature driving. For example, the lithium secondary battery may be used for applications requiring a high voltage range of about 4.3 volts (V) to about 4.6 V.

Example embodiments will be described in detail by using examples and comparative examples. However, these examples are provided herein for illustrative purposes only and are not intended to limit the scope of the present disclosure.

EXAMPLES

Comparative Example 1

(1) Preparation of $LiNi_{0.91}Co_{0.06}Mn_{0.03}O_2$ Positive Active Material

First, nickel sulfate, cobalt sulfate, and manganese sulfate were stoichiometrically mixed to obtain $Ni_{0.91}Co_{0.06}Mn_{0.03}(OH)_2$, which was to be used as a core active material precursor material by co-precipitation. For this purpose, nickel sulfate, cobalt sulfate and manganese sulfate were dissolved in distilled water at a concentration of 2 molar (M) to obtain a precursor mixture. $NH_4OH$ as a chelating agent and NaOH as a precipitant were added to this precursor mixture, and a continuous precipitation reaction was performed thereon at a temperature of 50° C. at a pH of about 11.5 to obtain a precipitate $Ni_{0.91}Co_{0.06}Mn_{0.03}(OH)_2$. The precipitate $Ni_{0.91}Co_{0.06}Mn_{0.03}(OH)_2$ obtained by the above procedure was washed with distilled water and dried at a temperature of 80° C. for 24 hours.

40 grams (g) of $Ni_{0.91}Co_{0.06}Mn_{0.03}(OH)_2$ obtained as described above was dry-mixed with 18.14 g of $LiOH-H_2O$ (=98% manufactured by Gangfeng Inc.) as a lithium precursor to prepare a mixture.

The mixture was heat-treated at 775° C. for 24 hours at $O_2$ atmosphere (flow rate: 40 L/min) to prepare $LiNi_{0.91}Co_{0.06}Mn_{0.03}O_2$ positive active material.

(2) Production of Lithium Secondary Battery

92% by weight of the prepared positive active material, 4% by weight of carbon black as a conductive agent, and 4% by weight of polyvinylidene difluoride (PVDF) as a binder were dispersed in N-methyl-2-pyrrolidone (NMP) to prepare a positive electrode slurry. The positive electrode slurry was coated on an aluminum (Al) thin film having a thickness of 20 μm to 30 μm, which was a positive current collector, dried, and roll-pressed to produce a positive electrode.

Metal lithium was used as a counter electrode with respect to the positive electrode, and an electrolytic solution used herein was prepared by adding 1.1M $LiPF_6$ to a solvent mixture including ethylene carbonate (EC), ethyl methyl carbonate (EMC), and dimethyl carbonate (DMC) at a volume ratio of 3:5:2.

A battery assembly was formed by placing a separator, which included a porous polyethylene (PE) film, between the positive electrode and the negative electrode. The battery assembly was compressed and placed in a battery case.

Then, the electrolyte solution was injected thereinto to form a lithium secondary battery (coin half cell, 2032 type).

Comparative Example 2

In order to prepare 0.05 mol % Al-doped $LiNi_{0.91}Co_{0.06}Mn_{0.03}O_2$, 40 g of $Ni_{0.91}Co_{0.06}Mn_{0.03}(OH)_2$ obtained from Comparative Example 1 was mixed with 18.14 g of $LiOH.H_2O$ (=98% manufactured by Gangfeng Inc.) as a lithium precursor and 0.081 g of $Al(NO_3)_3 \cdot 9H_2O$ (=98% manufactured by Sigma Aldrich), and the mixture was heat-treated to obtain the positive active material.

A lithium secondary battery was prepared in the same manner as in Comparative Example 1, except that the obtained positive active material was used.

Comparative Example 3

In order to prepare 0.05 mol % B-doped $LiNi_{0.91}Co_{0.06}Mn_{0.03}O_2$, 40 g of $Ni_{0.91}Co_{0.06}Mn_{0.03}(OH)_2$ obtained from Comparative Example 1 was mixed with 18.14 g of $LiOH.H_2O$ (=98% manufactured by Gangfeng Inc.) as a lithium precursor and 0.0047 g of $LiBH_4$ powder (=98.0% manufactured by Sigma Aldrich), and the mixture was heat-treated to obtain the positive active material.

A lithium secondary battery was prepared in the same manner as in Comparative Example 1, except that the obtained positive active material was used.

Comparative Example 4

In order to prepare 0.100 mol % Al and 0.025 mol % B-doped $LiNi_{0.91}Co_{0.06}Mn_{0.03}O_2$, 40 g of $Ni_{0.91}Co_{0.06}Mn_{0.03}(OH)_2$ obtained from Comparative Example 1 was mixed with 18.14 g of $LiOH \cdot H_2O$ (=98% manufactured by Gangfeng Inc.) as a lithium precursor, 0.162 g of $Al(NO_3)_3 \cdot 9H_2O$ (=98% manufactured by Sigma Aldrich) as an aluminum precursor, and 0.0024 g of $LiBH_4$ powder (=98.0% manufactured by Sigma Aldrich) as a borate precursor, and the mixture was heat-treated to obtain the positive active material.

A lithium secondary battery was prepared in the same manner as in Comparative Example 1, except that the obtained positive active material was used.

Comparative Example 5

In order to prepare 0.200 mol % Al and 0.050 mol % B-doped $LiNi_{0.91}Co_{0.06}Mn_{0.03}O_2$, 40 g of $Ni_{0.91}Co_{0.06}Mn_{0.03}(OH)_2$ prepared according to Comparative Example 1 was mixed with 18.14 g of $LiOH \cdot H_2O$ (=98% manufactured by Gangfeng Inc.) as a lithium precursor, 0.324 g of $Al(NO_3)_3 \cdot 9H_2O$ (=98%, manufactured by Sigma Aldrich Inc.) as an aluminum precursor, and 0.0047 g of $LiBH_4$ powder (=98.0%, manufactured by Sigma Aldrich Inc.) as a borate precursor, and the mixture was heat treated to obtain the positive active material.

A lithium secondary battery was produced in the same manner as in Comparative Example 1 except that the obtained positive active material was used.

Example 1

In order to prepare 0.300 mol % Al and 0.075 mol % B-doped $LiNi_{0.91}Co_{0.06}Mn_{0.03}O_2$, 40 g of $Ni_{0.91}Co_{0.06}Mn_{0.03}(OH)$ prepared according to Comparative Example 1 was mixed with 18.14 g of $LiOH \cdot H_2O$ (=98% manufactured by Gangfeng Inc.) as a lithium precursor, 0.486 g of $Al(NO_3)_3 \cdot 9H_2O$ (=98%, manufactured by Sigma Aldrich Inc.) as an aluminum precursor, and 0.0072 g of $LiBH_4$ powder (=98.0%, manufactured by Sigma Aldrich Inc.) as a borate precursor, and the mixture was heat treated to obtain the positive active.

A lithium secondary battery was produced in the same manner as in Comparative Example 1 except that the obtained positive active material was used.

Example 2

In order to prepare 0.400 mol % Al and 0.100 mol % B-doped $LiNi_{0.91}Co_{0.06}Mn_{0.03}O_2$, 40 g of $Ni_{0.91}Co_{0.06}Mn_{0.03}(OH)_2$ prepared according to Comparative Example 1 was mixed with 18.14 g of $LiOH \cdot H_2O$ (=98% manufactured by Gangfeng Inc.) as a lithium precursor, 1.296 g of $Al(NO_3)_3 \cdot 9H_2O$ (=98%, manufactured by Sigma Aldrich Inc.) as an aluminum precursor, and 0.0096 g of LiBH$_4$ powder (=98.0%, manufactured by Sigma Aldrich Inc.), and the mixture was heat treated to obtain the positive active.

A lithium secondary battery was produced in the same manner as in Comparative Example 1 except that the obtained positive active material was used.

Evaluation Example 1-(1): ICP Analysis

ICP analysis was performed on the positive active materials prepared according to Examples 1 and 2 and Comparative Examples 1-5. Results thereof are shown in Table 1. ICP analysis was performed by using an ICPS-8100 model produced by SHIMADZU Inc.

TABLE 1

| | Li/Me ratio | | | | Mole | | Formula | | Content Dopant |
| --- | --- | --- | --- | --- | --- | --- | --- | --- | --- |
| | Li | Mn | Co | Ni | Al | B | Al:B | Al$x$B$y$O$z$ | (mol %) |
| Comparative Example 1 Bare | 1.03 | 0.029 | 0.060 | 0.911 | 0.0000 | 0.0000 | | | 0 |
| Comparative Example 2 0.050% Al alone | 1.02 | 0.029 | 0.060 | 0.911 | 0.0006 | 0.0000 | | | 0.06 |
| Comparative Example 3 0.050% B alone | 1.04 | 0.029 | 0.060 | 0.911 | 0.0000 | 0.0005 | | | 0.05 |
| Comparative Example 4 0.10% Al + 0.025% B | 1.03 | 0.029 | 0.060 | 0.911 | 0.0011 | 0.00026 | 4.50:1.02 | | 0.022 |
| Comparative Example 5 0.20% Al + 0.050% B | 1.03 | 0.029 | 0.060 | 0.912 | 0.0021 | 0.00048 | 4.50:1.09 | | 0.045 |
| Example 1 0.30% Al + 0.075% B | 1.02 | 0.029 | 0.060 | 0.912 | 0.0031 | 0.00078 | 4.50:1.09 | Al$_{18}$B$_4$O$_{33}$ | 0.062 |
| Example 2 0.40% Al + 0.100% B | 1.01 | 0.028 | 0.059 | 0.913 | 0.0042 | 0.0011 | 4.50:1.08 | Al$_{18}$B$_4$O$_{33}$ | 0.083 |

TABLE 2

| | Al amount | B amount | I$_{(003)}$/I$_{(104)}$ |
| --- | --- | --- | --- |
| Comparative Example 1 | 0 | 0 | 1.54 |
| Comparative Example 4 | 0.100 mol % | 0.025 mol % | 1.59 |
| Comparative Example 5 | 0.200 mol % | 0.050 mol % | 1.60 |
| Example 1 | 0.300 mol % | 0.075 mol % | 1.56 |
| Example 2 | 0.400 mol % | 0.100 mol % | 1.60 |

Figure 2:
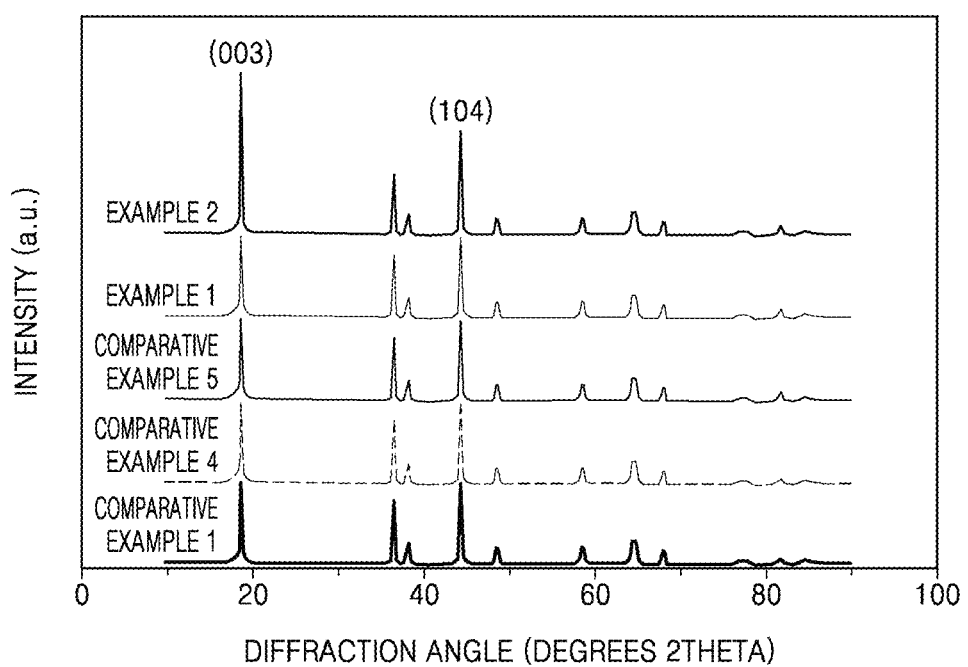
FIG. 2 is a graph of intensity (arbitrary units, a.u.) versus diffraction angle (degrees 2 theta), which shows X-ray diffraction results of the positive active materials prepared according to Examples 1 and 2 and Comparative Examples 1, 4, and 5.
Figure 3:
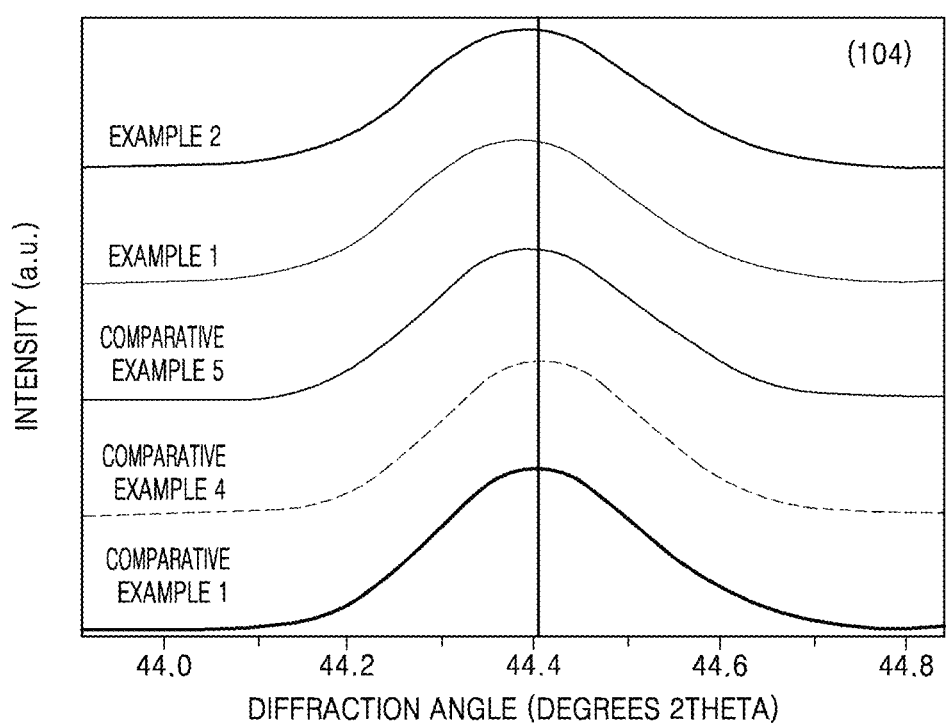
FIG. 3 shows an enlarged portion of the area corresponding to the (104) plane in the graph in FIG. 2.

FIG. 3 is an enlarged portion of the area corresponding to the (104) plane in the graph of FIG. 2, and further shows the results of the X-ray diffraction analysis of Examples 1 and 2 and Comparative Examples 1, 4, and 5. As shown in FIG. 3, it can be seen that as the doping amount increases in the positive electrode active material, the peak of (104) plane shifts toward a lower angle.

Figure 4:
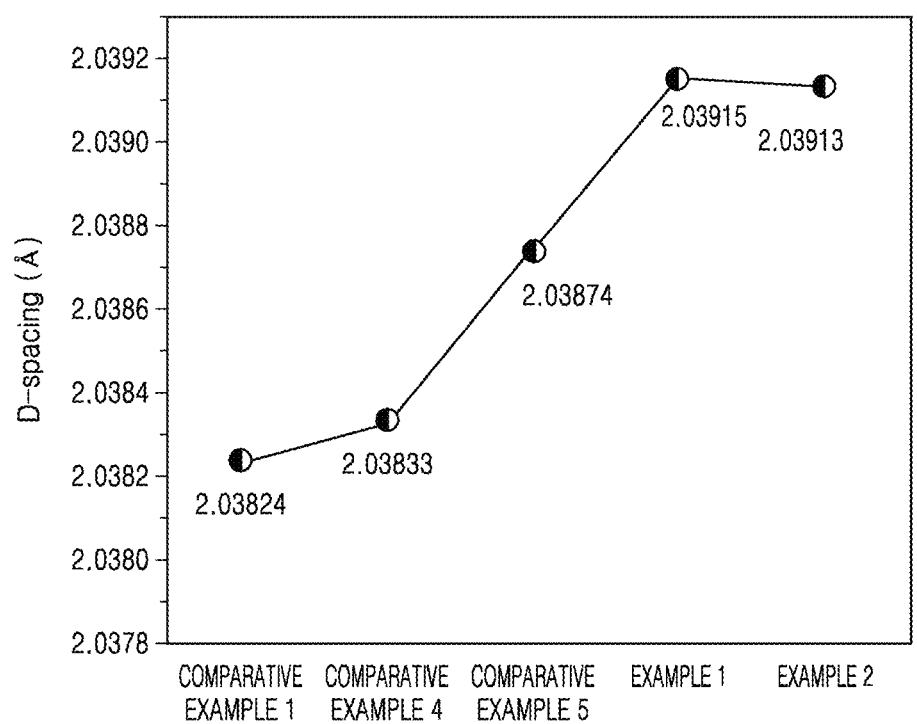
FIG. 4 is a graph of D-spacing (angstroms, A), which shows the inter-layer distance of the positive active materials prepared according to Examples 1 and 2 and Comparative Examples 1, 4, and 5.
Figure 5C:
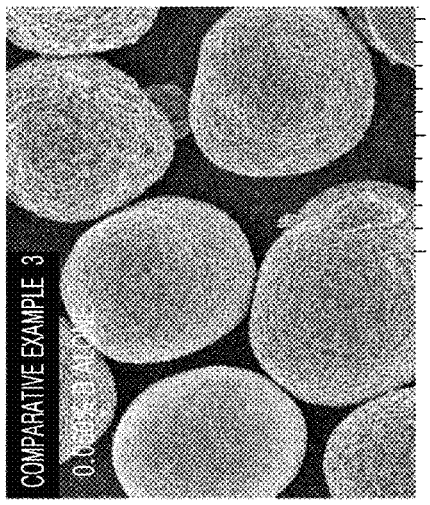
FIGS. 5A to 5E are scanning electron microscope (SEM) images of the positive active materials prepared according to Comparative Examples 1 to 5, respectively.
Figure 5B:
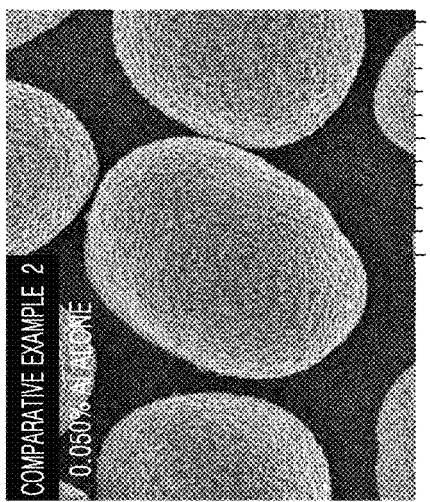
Figure 5E:
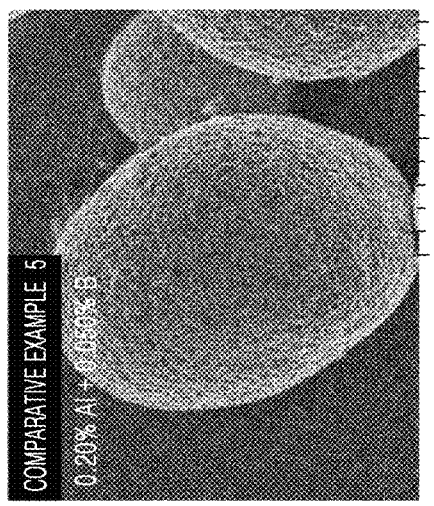
Figure 5A:
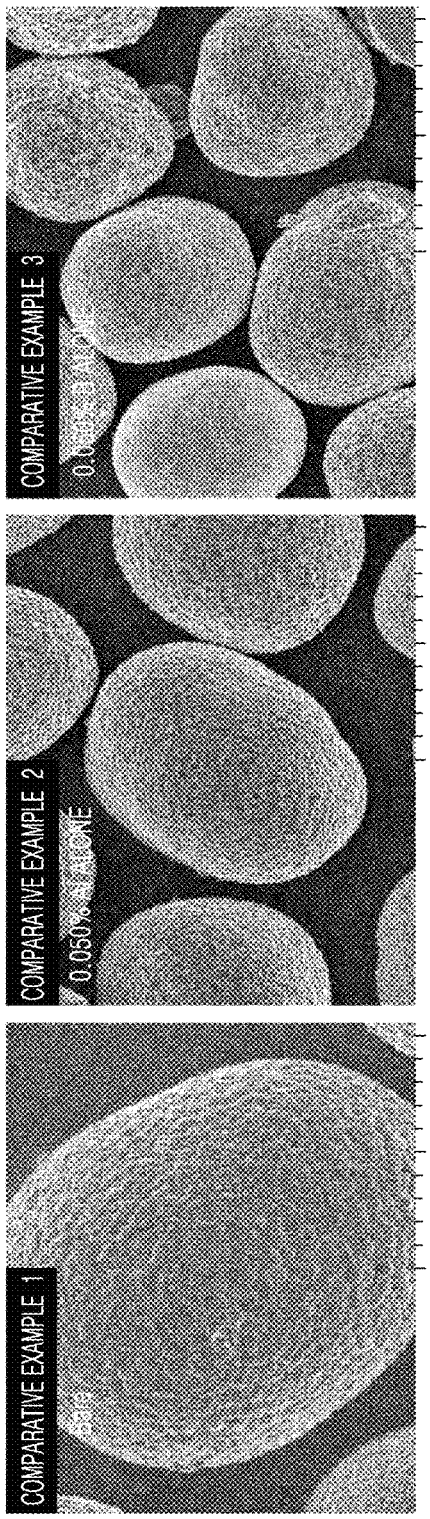
Figure 5D:
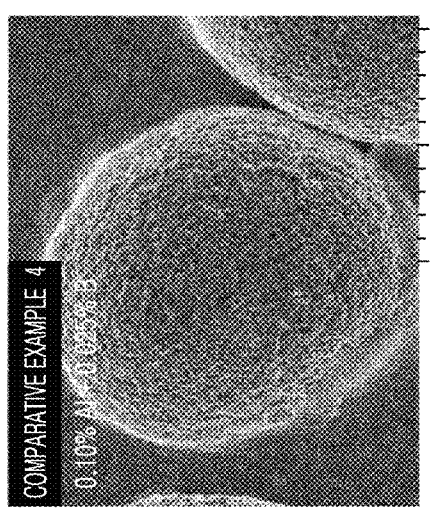

FIG. 4 shows the measurements of the inter-layer distance of the positive active materials prepared according to Examples 1 and 2 and Comparative Examples 1, 4, and 5. As shown in FIG. 4, as the doping amount increases, the interlayer distance of the positive active material increases. The increase in the interlayer distance indicates that the lattice expansion has occurred. In Examples 1 and 2, the excess in the available doping amount had led to the formation of the nanostructure on the surface of the positive active material, and thus, no further increase in the interlayer distance was observed.

Evaluation Example 3-(1): Scanning Electron Microscope Analysis

Scanning electron microscope (SEM) analysis was performed on the positive active materials prepared according to Examples 1 and 2 and Comparative Examples 1 to 5.

Electron scanning microscope analysis was performed on the positive active materials prepared according to Com- As shown in Table 1, the core active material is an NCM active material having a high Ni content, Al and B participate in doping and coating at the same time in the doped compounds prepared according to Examples 1 and 2, wherein Al and B are both element type doping of the layered structure, and the coated compounds were Al$_{18}$B$_4$O$_{33}$.

Evaluation Example 2-(1): XRD Analysis

X-ray diffraction analysis using CuKa was performed on the positive active materials prepared in Examples 1 and 2 and Comparative Examples 1, 4, and 5. X-ray diffraction analysis was carried out using a Rigaku RINT2200HF+ diffractometer using Cu Ka radiation (1.540598 Å).

The X-ray diffraction analysis results of Examples 1 and 2 and Comparative Examples 1, 4, and 5 are shown in FIG. 2. As shown in FIG. 2, it can be seen that LiNi$_{0.91}$Co$_{0.06}$Mn$_{0.03}$O$_2$ was formed, from the characteristic peaks of the (003) plane and the (104) plane.

Figure 6A:
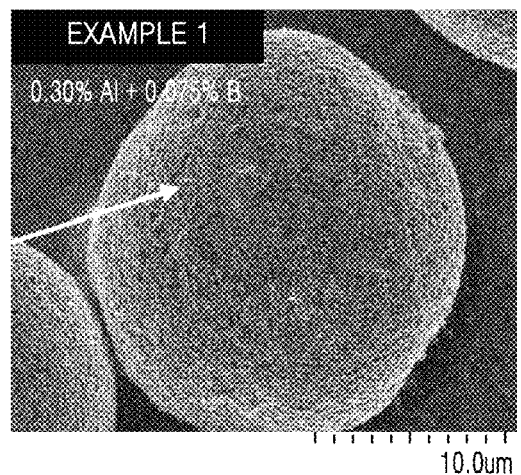
FIGS. 6A and 6B are scanning electron microscopic images of the positive active materials prepared according to Examples 1 and 2, respectively.
Figure 6B:
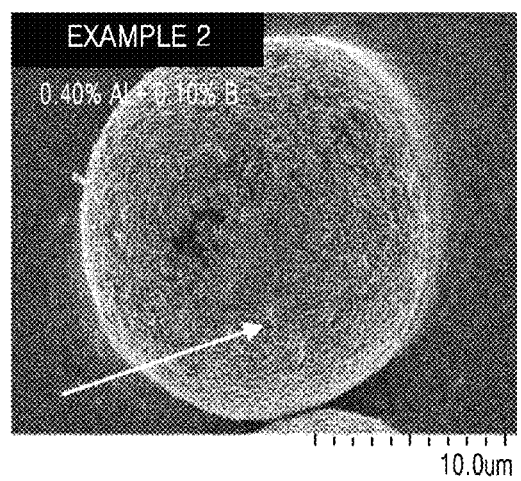

The intensity ratio (I$_{(003)}$/I$_{(104)}$) of the peak of the (003) plane to the peak of the (104) plane is as shown in Table 2.

parative Examples 1 to 5. Results thereof are shown in FIGS. 5A to 5E, respectively, and the results of SEM analysis of Examples 1 and 2 are shown in FIGS. 6A and 6B, each respectively.

As shown in FIGS. 5A to 5E and 6A and 6B, when the used amount of the aluminum precursor and the borate precursor is low, there is no difference in the image of the surface of the positive active material since only doping occurred, and when the used amount of the aluminum precursor and the borate precursor increased as in Examples 1 and 2, it is confirmed that nano-rod grew on the surface of the positive active material.

SEM EDAX Mapping analysis was performed on the positive active material prepared in Example 2, and the results are shown in the color images of FIGS. 7A to 7C.

As shown in FIGS. 7A to 7C, Al and B components overlap each other, and when the 0.075 mol % $Al_{18}B_4O_{33}$ was doped, the coating effect was obtained together with the doping. In FIG. 7A, the nano-rod shape at the center of the image is a surface-grown $Al_{18}B_4O_{33}$ nanostructure.

Evaluation Example 4-(1): High Resolution Transmission Electron Microscope (HRTEM) Analysis A HRTEM analysis was performed on the positive active material prepared in Example 1, and the results are shown in FIGS. 8A to 8C.

Figure 8A:
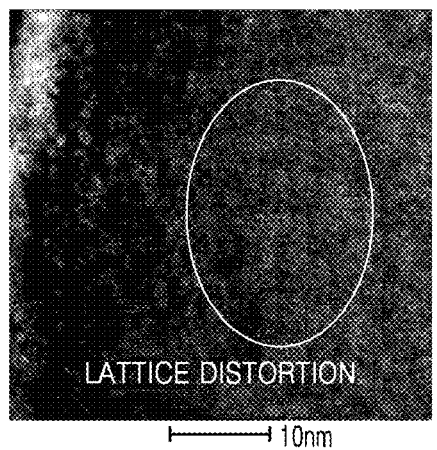
FIGS. 8A to 8C are images obtained by high-resolution transmission electron microscope (HRTEM) analysis of the positive active material prepared in Example 1.
Figure 8B:
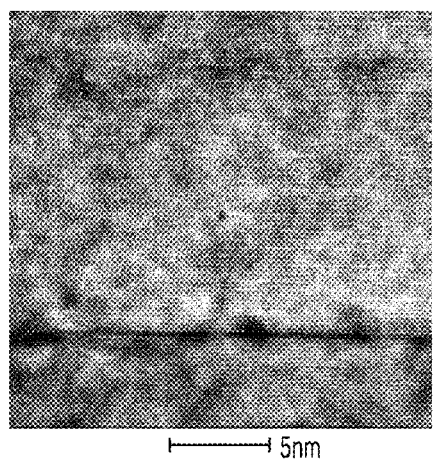
Figure 8C:
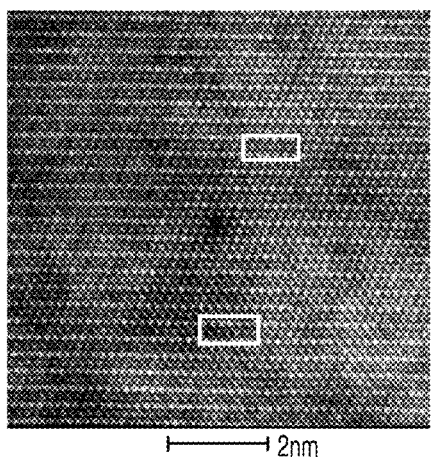

FIG. 8A shows that the lattice distortion of the positive active material occurs due to the doping of Al and B in $LiNi_{0.91}Co_{0.06}Mn_{0.03}O_2$ having a layered structure. Al and B occupy, in a pair, tetrahedral sites, resulting in lattice expansion, and low angle shift in XRD. Through this lattice distortion, the structural stability of the crystal structure may be improved, and charging and discharging occur stably.

Evaluation Example 5-(1): Charging and Discharging Characteristics

The initial efficiency, capacity, and rate characteristics of the lithium secondary batteries prepared according to Examples 1 and 2 and Comparative Examples 1 to 5 were measured, and the results are shown in Table 3.

The charge and discharge capacities during the first cycle were measured as follows: 4.35 V (vs Li) charging (cc mode) was performed at a current capacity of 0.1 C for formation, and then, the voltage of 4.35 V (cc mode) was maintained and at the current of 0.05 C rate, cut-off was performed. 2.8 V (vs Li) discharging (cc mode) was performed at a current capacity of 0.1 C. To measure rate characteristics, 4.35 V charging (cc-cv mode, 0.05C cut) was performed at the current capacity of 0.5 C, and then, 2.8 V(vs Li) discharging (cc mode) was performed at the current capacity of 0.2, 0.33, 1, 2, or 3C. Here, initial efficiency (I.E.) is defined as a first-cycle discharge capacity/first-cycle charge capacity, and a rate characteristic is defined as a ratio of discharge capacity as shown in the following table. In the following table, "Cha" means "charge" and "Dis" means "discharge".

TABLE 3

| Sample Name | Formation (1st cycle) | | | Rate characteristics | | | | | | | |
|---|---|---|---|---|---|---|---|---|---|---|---|
| | 0.1 C Cha (mAh/g) | 0.1 C Dis (mAh/g) | I.E. (%) | 0.2 C Dis (mAh/g) | 0.33 C Dis (mAh/g) | 1 C Dis (mAh/g) | 2 C Dis (mAh/g) | 3 C Dis (mAh/g) | 1 C/0.1 C (%) | 2 C/0.2 C (%) | 3 C/0.33 C (%) |
| Comparative Example 1 | 247 | 232 | 94 | 227 | 222 | 212 | 207 | 203 | 92 | 91 | 92 |
| Comparative Example 2 | 248 | 232 | 94 | 227 | 221 | 211 | 205 | 201 | 91 | 91 | 91 |
| Comparative Example 3 | 238 | 212 | 89 | 207 | 202 | 190 | 182 | 175 | 90 | 88 | 87 |
| Comparative Example 4 | 248 | 231 | 93 | 226 | 221 | 211 | 205 | 202 | 92 | 91 | 92 |
| Comparative Example 5 | 247 | 229 | 93 | 226 | 221 | 212 | 206 | 203 | 93 | 92 | 92 |
| Example 1 | 246 | 222 | 90 | 220 | 217 | 208 | 203 | 200 | 94 | 92 | 92 |
| Example 2 | 246 | 217 | 89 | 217 | 215 | 206 | 201 | 197 | 95 | 92 | 92 |

In addition, the coin-half cells manufactured according to Examples 1 and 2 and Comparative Examples 1 to 5 were charged with a constant current until the voltage reached 4.35 V at a current of 1 C rate, and then, discharged at a constant current of 1 C until the voltage reached 2.8 V. This cycle of charging and discharging was performed 50 times.

The lifespan characteristics of the coin-half cells of Examples 1 and 2 and Comparative Examples of 1 to 5 were measured, and the results thereof are shown in Table 4. In Table 4, the 0.2C recovery (%) was obtained by measuring the standard capacity at a rate of 0.2 C immediately before the cycle test, measuring the lifespan through the cycles repeated 50 times, and then, measuring the capacity at a rate of 0.2 C in the 51st cycle, and in this regard, the 0.2C recovery (%) indicates the degree of recovery (%) of coin-half cells after 50th cycles with respect to the standard capacity. This measurement refers to an indirect indicator of the stability of the sample.

TABLE 4

| | Cycle life | | | | |
|---|---|---|---|---|---|
| Sample Name | 1st (mAh/g) | 50th/1st (%) | Cap. @50th | 0.2 C Recovery (%) | 0.2 C @51th |
| Comparative Example 1 | 208 | 78 | 161 | 86 | 194 |
| Comparative Example 2 | 205 | 74 | 152 | 71 | 162 |
| Comparative Example 3 | 179 | 74 | 133 | 83 | 172 |
| Comparative Example 4 | 206 | 73 | 149 | 84 | 189 |
| Comparative Example 5 | 208 | 88 | 184 | 93 | 209 |

TABLE 4-continued

| | | Cycle life | | |
|---|---|---|---|---|
| Sample Name | $1^{st}$ (mAh/g) | $50^{th}/1^{st}$ (%) | Cap. @$50^{th}$ | 0.2 C Recovery (%) | 0.2 C @51th |
| Example 1 | 204 | 91 | 185 | 96 | 214 |
| Example 2 | 201 | 91 | 182 | 97 | 211 |

As can be seen from the charge and discharge results, it may be confirmed that when a positive active material includes Al and B doped at an amount of 0.075% or greater and, at the same time, is coated with an aluminum borate compound, rate characteristics and lifespan characteristics are improved.

Figure 9:
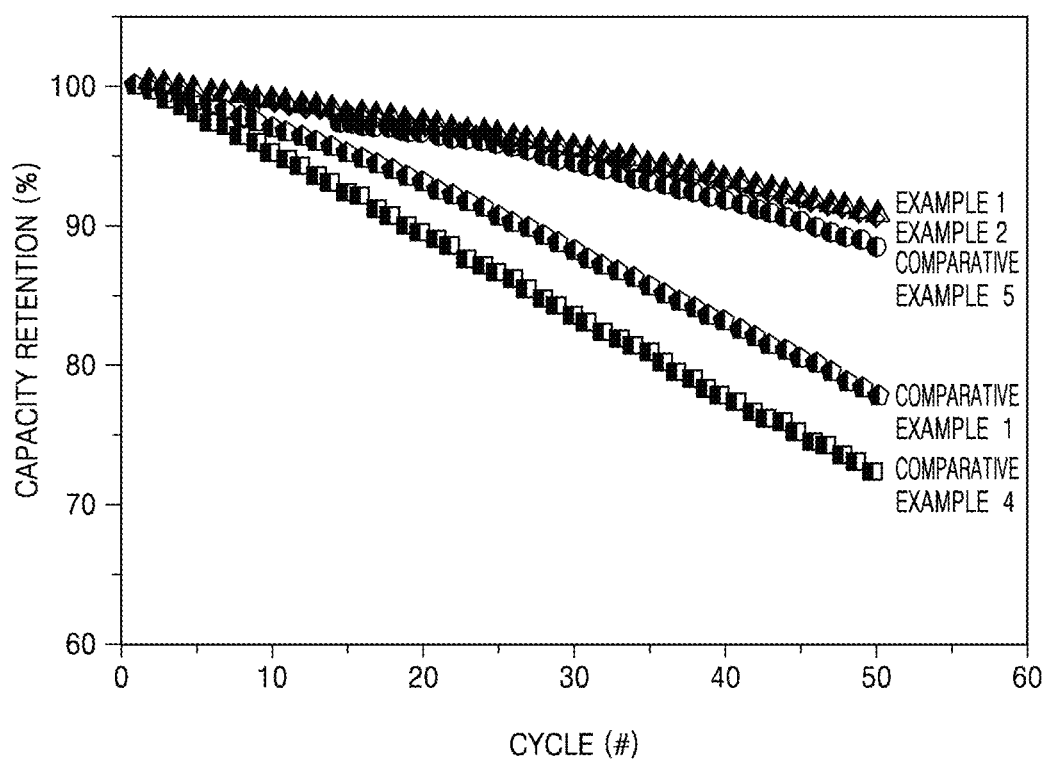
FIG. 9 is a graph of capacity retention (percent, %) versus cycle number (#), which shows the capacity retention per cycle of lithium secondary batteries manufactured in Examples 1 and 2, and Comparative Examples 1, 4 and 5.
Figure 10:
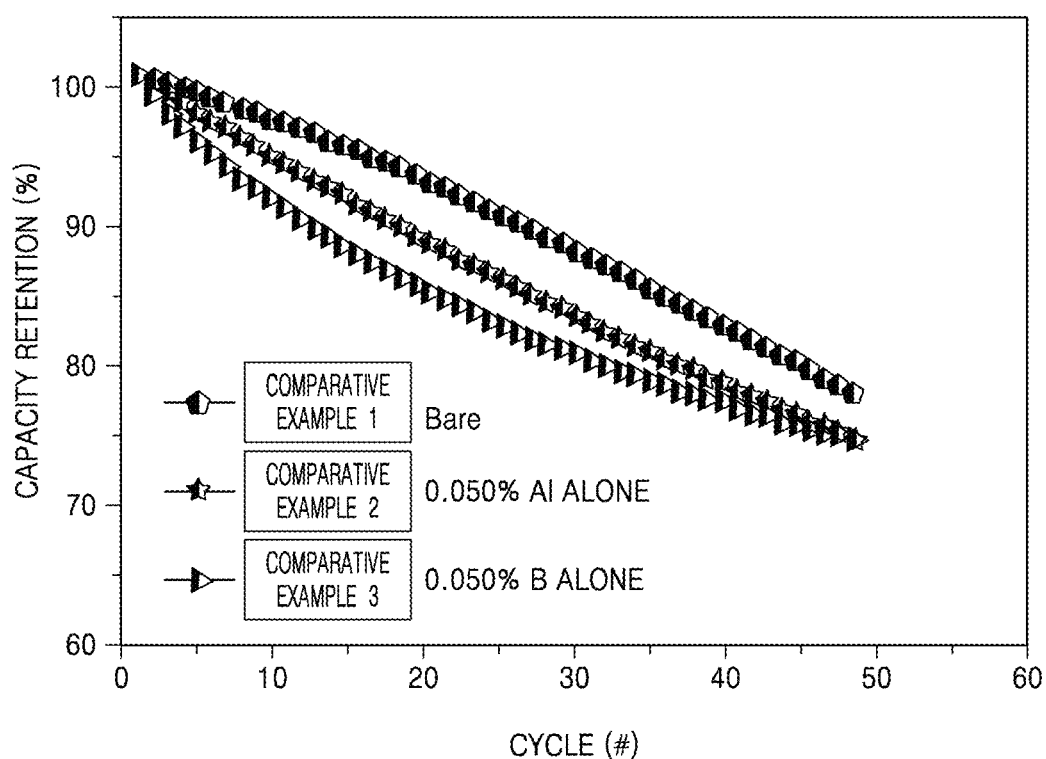
FIG. 10 is a graph of capacity retention (%) versus cycle number (#), which shows the capacity retention per cycle of lithium secondary batteries manufactured according to Comparative Examples 1 to 3.

The capacity retention with respect to the cycle number of Examples 1 and 2 and Comparative Examples 1, 4, and 5 are shown in FIG. 9, and the capacity retention of Comparative Examples 1 to 3 with respect to the cycle number are shown in FIG. 10. The capacity retention is defined by Equation 1:

Capacity retention [%]=[discharging capacity in each cycle/discharging capacity in 1st cycle]×100%. Equation 1

As shown in FIG. 9, when a positive active material includes Al and B doped at an amount of 0.075% or greater and, at the same time, is coated with an aluminum borate compound, lifespan characteristics are improved. On the other hand, as shown in FIG. 10, when Al or B alone was doped, the lifetime characteristics were reduced compared to when an undoped positive active material is used.

Comparative Example 6

Nickel sulfate, cobalt sulfate, and manganese sulfate were stoichiometrically mixed to obtain $Ni_{0.88}Co_{0.08}Mn_{0.04}(OH)_2$, which was to be used as a core active material precursor material by co-precipitation, and this was mixed with $LiOH·H_2O$ and heat-treated at 760° C. for 24 hours to obtain $LiNi_{0.88}Co_{0.08}Mn_{0.04}O_2$ as a positive active material.

A lithium secondary battery was prepared in the same manner as in Comparative Example 1, except that the obtained positive active material was used.

Comparative Example 7

40.9 g of $Ni_{0.88}Co_{0.08}Mn_{0.04}(OH)_2$ obtained from Comparative Example 6 was dry-mixed with 19.1 g of $LiOH·H_2O$ and 0.066 g of $H_2BO_3$, and the mixture was heat-treated to prepare 0.25 mol % B-doped $LiNi_{0.88}Co_{0.08}Mn_{0.04}O_2$.

A lithium secondary battery was prepared in the same manner as in Comparative Example 1, except that the obtained positive active material was used.

Comparative Example 8

40.8 g of $Ni_{0.88}Co_{0.08}Mn_{0.04}(OH)_2$ obtained from Comparative Example 6 was dry-mixed with 19.0 g of $LiOH·H_2O$ and 0.17 g of $Zr(OH)_4$, and the mixture was heat-treated to prepare 0.25 mol % Zr-doped $LiNi_{0.88}Co_{0.08}Mn_{0.04}O_2$.

A lithium secondary battery was prepared in the same manner as in Comparative Example 1, except that the obtained positive active material was used.

Comparative Example 9

40.9 g of $Ni_{0.88}Co_{0.08}Mn_{0.04}(OH)_2$ obtained from Comparative Example 6 was dry-mixed with 19.1 g of $LiOH·H_2O$ and 0.083 g of $Al(OH)_3$, and the mixture was heat-treated to prepare 0.25 mol % Al-doped $LiNi_{0.88}Co_{0.08}Mn_{0.04}O_2$.

A lithium secondary battery was prepared in the same manner as in Comparative Example 1, except that the obtained positive active material was used.

Example 3

40.7 g of $Ni_{0.88}Co_{0.08}Mn_{0.04}(OH)_2$ obtained from Comparative Example 6 was dry-mixed with 19.1 g of $LiOH·H_2O$, 0.066 g of $H_2BO_3$, and 0.170 g of $Zr(OH)_4$, and the mixture was heat-treated to prepare 0.25 mol % of B-doped and 0.25 mol % of Zr-doped $LiNi_{0.88}Co_{0.08}Mn_{0.04}O_2$.

A lithium secondary battery was prepared in the same manner as in Comparative Example 1, except that the obtained positive active material was used.

Example 4

40.7 g of $Ni_{0.88}Co_{0.08}Mn_{0.04}(OH)_2$ obtained from Comparative Example 6 was dry-mixed with 19.0 g of $LiOH·H_2O$, 0.132 g of $H_2BO_3$, and 0.170 g of $Zr(OH)_4$, and the mixture was heat-treated to prepare 0.50 mol % of B-doped and 0.25 mol % of Zr-doped $LiNi_{0.88}Co_{0.08}Mn_{0.04}O_2$.

A lithium secondary battery was prepared in the same manner as in Comparative Example 1, except that the obtained positive active material was used.

Example 5

40.9 g of $Ni_{0.88}Co_{0.08}Mn_{0.04}(OH)_2$ obtained from Comparative Example 6 was dry-mixed with 18.7 g of $LiOH·H_2O$, 0.133 g of $H_2BO_3$, 0.171 g of $Zr(OH)_4$, and 0.042 g of $Al(OH)_3$, and the mixture was heat-treated to prepare 0.50 mol % of B-doped, 0.25 mol % of Zr-doped, and 0.125 mol % of Al-doped $LiNi_{0.88}Co_{0.08}Mn_{0.04}O_2$.

A lithium secondary battery was prepared in the same manner as in Comparative Example 1, except that the obtained positive active material was used.

Evaluation Example 1-(2): ICP Analysis

ICP analysis was performed on the positive active materials prepared according to Examples 3 to 5 in the same manner as in Evaluation Example 1-(1). As a result, it was confirmed that the oxide form of the nanostructure grown on the surface was $ZrBO_3$ in the case of Example 3, $ZrB_2O_5$ in the case of Example 4, and a composite coating of $ZrB_2O_5$ and $Al_{18}B_4O_{33}$ in the case of Example 5.

The amounts of Zr, Al, and B contained in the lithium secondary batteries prepared according to Comparative Examples 6 to 9 and Example 3 to 5 are shown in Table 5.

TABLE 5

| | Zr amount | Al amount | B amount |
|---|---|---|---|
| Comparative Example 6 | 0 | 0 | 0 |
| Comparative Example 7 | 0 | 0 | 0.25 mol % |
| Comparative Example 8 | 0.25 mol % | 0 | 0 |
| Comparative Example 9 | 0 | 0.25 mol % | 0 |

TABLE 5-continued

|  | Zr amount | Al amount | B amount |
|---|---|---|---|
| Example 3 | 0.25 mol % | 0 mol % | 0.25 mol % |
| Example 4 | 0.25 mol % | 0 mol % | 0.50 mol % |
| Example 5 | 0.25 mol % | 0.124 mol % | 0.50 mol % |

Evaluation Example 2-(2): XRD Analysis

X-ray diffraction analysis (XRD) was performed on the positive active materials prepared in Examples 3 to 5 and Comparative Examples 6 to 9 in the same manner as in Evaluation Example 2-(1).

Figure 11:
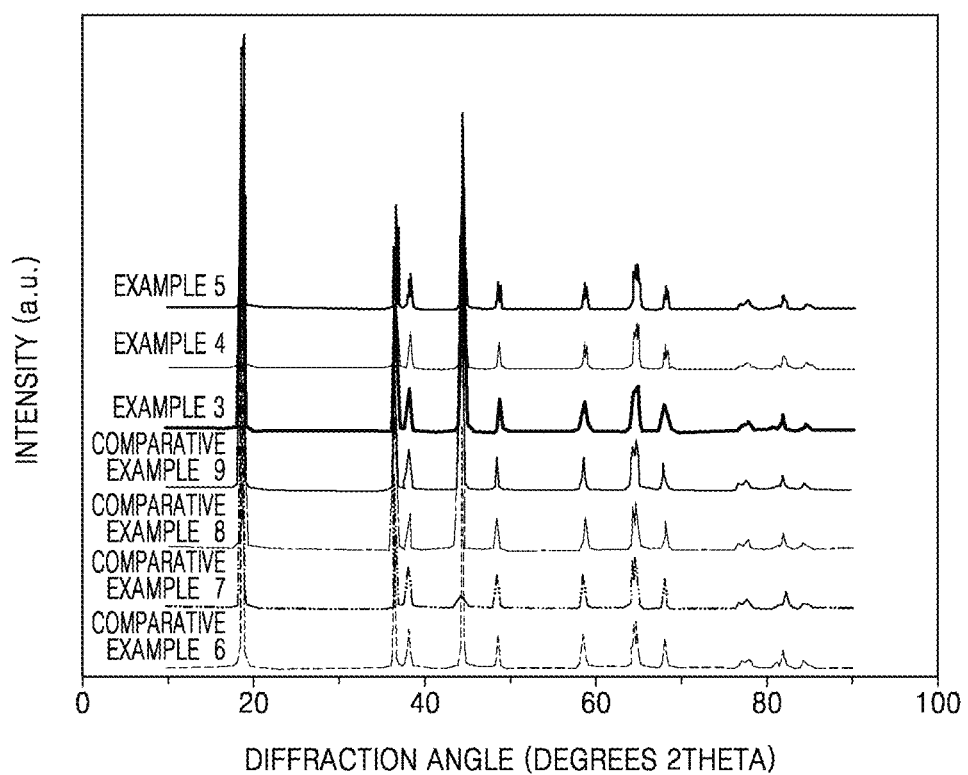
FIG. 11 is a graph of intensity (a.u.) versus diffraction angle (degrees 2 theta), which shows the results of X-ray diffraction analysis performed on the positive active materials prepared in Examples 3 to 5 and Comparative Examples 6 to 9.

The XRD analysis results of Examples 3 to 5 and Comparative Examples 6 to 9 are shown in FIG. 11. As shown in FIG. 11, it can be seen that $LiNi_{0.88}Co_{0.08}Mn_{0.04}O_2$ was formed, from the characteristic peaks of the (003) plane and the (104) plane.

Figure 12:
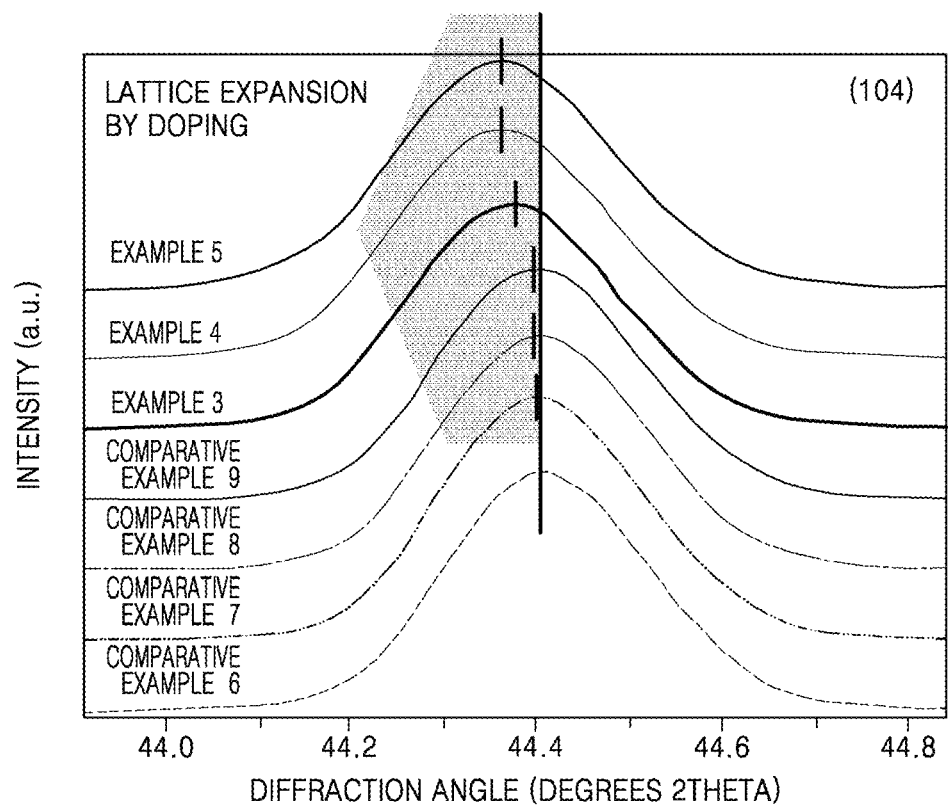
FIG. 12 is an enlarged portion of the area in the graph of FIG. 11 corresponding to the (104) plane.

Also, from the XRD analysis results of Examples 3 to 5 and Comparative Examples 6 to 9, a graph of an enlarged area corresponding to the (104) plane is shown in FIG. 12.

As shown in FIG. 12, according to doping of B and a metal element in the positive active material, and as amounts of doping and coating increase, the (104) peak shifted toward a low angle.

Figure 13A:
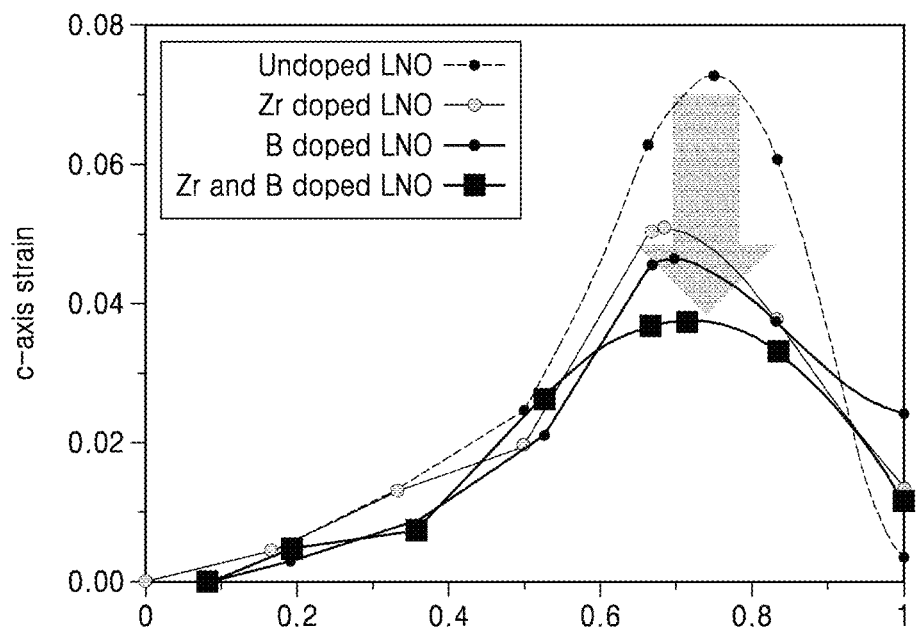
FIG. 13A is a graph of c-axis strain versus relative charge, showing the results of a c-axis change in a positive active material during a charging process to confirm a B-metal paired effect, which is an effect associated with paired doping of B and a metal element in a lithium layer of $LiNiO_2$.
Figure 13B:
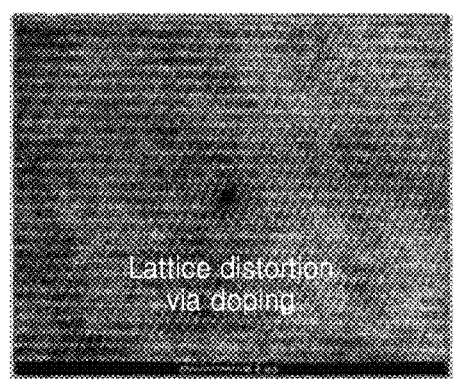
FIG. 13B is a TEM image showing lattice distortion from doping.
Figure 15A:
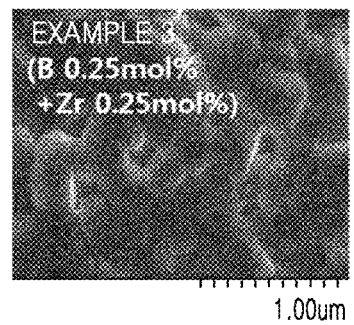
FIGS. 15A to 15I are images which show the SEM analysis results of Example 3 (FIGS. 15A to 15C), Example 4 (FIGS. 15D to 15F), and Example 5 (FIGS. 15 G to 15I)
Figure 15B:
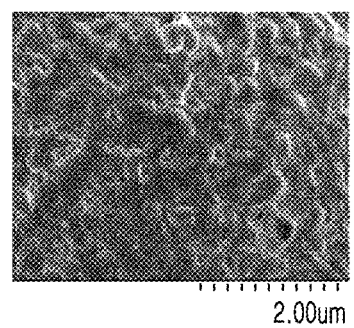
Figure 15C:
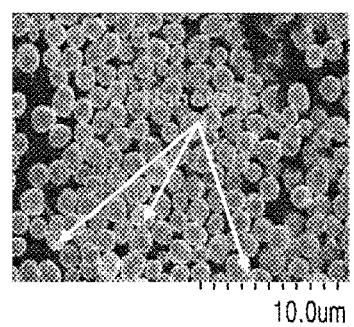
Figure 15D:
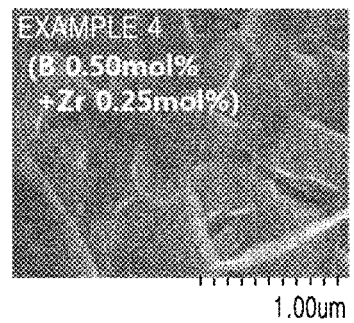
Figure 15E:
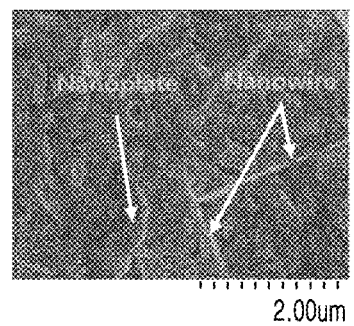
Figure 15F:
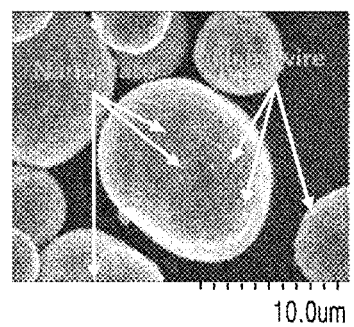
Figure 15G:
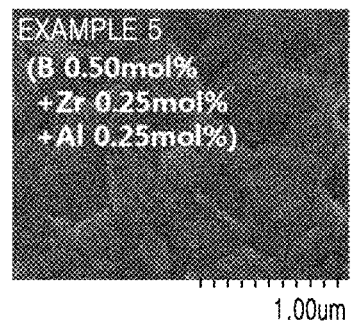
Figure 15H:
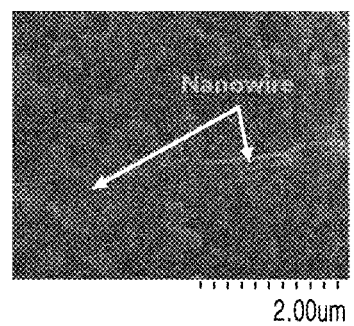
Figure 15I:
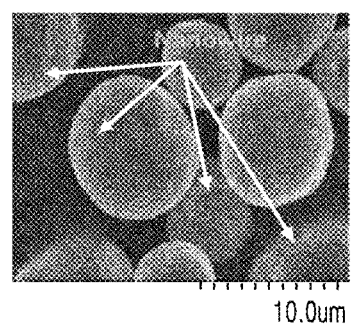
Figure 16H:
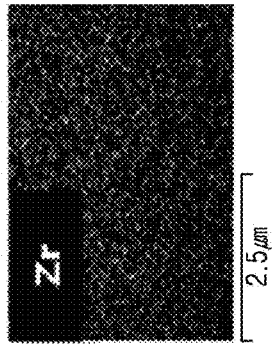
Figure 16I:
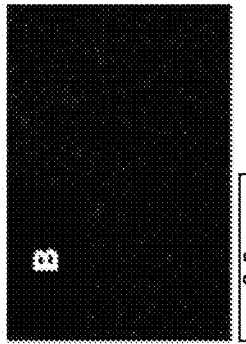
Figure 16J:
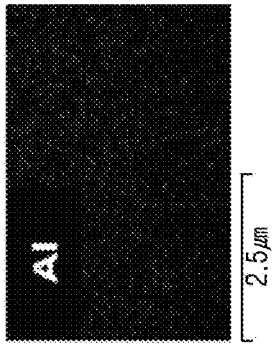
Figure 16G:
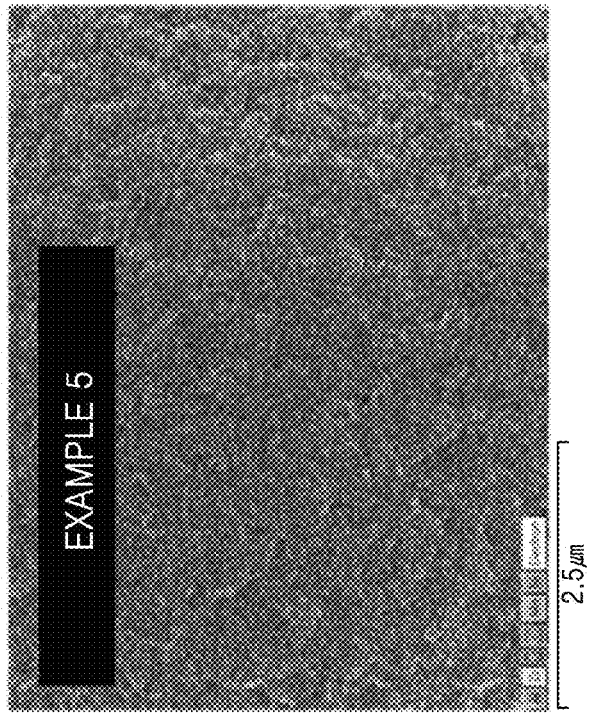

Additionally, in order to confirm a B-metal paired effect in the lithium layer of $LiNiO_2$, the results of a c-axis change simulation of the positive active material during a charging process are shown in FIG. 13A. As shown in FIG. 13A, the change in the position of the c-axis of the lattice (change to a Li site) during the charging process was significantly decreased due to the paired doping of B-metal species, and had the maximum of 51.7% decrease. In this regard, it was confirmed that when B and a metal element are doped as a pair, a structural collapse of the positive active material during a charging/discharging process may be prevented, and thus may result in structural stabilization, as shown in FIG. 13B.

Evaluation Example 3-(2): SEM Analysis

SEM analysis was performed on the positive active materials prepared in Examples 3 to 5 and Comparative Examples 6 to 9 in the same manner as in Evaluation Example 3-(1).

The results of the SEM analysis of the positive active materials prepared in Comparative Examples 6 to 9 are shown in FIGS. 14A to 14L, and the results of the SEM analysis of the positive active materials prepared in Examples 3 to 5 are shown in FIGS. 15A to 15I, respectively.

As shown in FIGS. 14A to 14L and 15A to 15I, although growth of nanowires on a surface of the positive active materials did not happen in the cases of doping of B or metal alone, nanowires and/or nanoplates grew on a surface of the positive active material along with the doping when B and a metal element were used simultaneously.

SEM EDAX Mapping analysis was performed on the positive active materials prepared in Examples 3 to 5, and the results are shown FIGS. 16A to 16J, respectively.

As shown in the color images of FIGS. 16A to 16J, the B component and the metal component were overlapped in the image, and it may be confirmed that doping and coating were evenly performed on the positive active materials.

Evaluation Example 4-(2): Charge/Discharge Characteristics Evaluation

The initial efficiency, capacity, rate characteristics, and lifespan characteristics of the lithium secondary batteries prepared according to Examples 3 to 5 and Comparative Examples 6 to 8 were measured, and the results are shown in Table 6. Here, data of Table 6 is the result of applying the positive active material before water-washing after preparation of the positive active material.

TABLE 6

| Sample Name | Formation (1st cycle) | | | Rate characteristics | | | | | | Cycle life | |
|---|---|---|---|---|---|---|---|---|---|---|---|
|  | 0.1 C Cha (mAh/g) | 0.1 C Dis (mAh/g) | I.E. (%) | 0.2 C Dis (mAh/g) | 0.33 C Dis (mAh/g) | 1 C Dis (mAh/g) | 2 C Dis (mAh/g) | 3 C Dis (mAh/g) | 1 C/0.1 C (%) | $1^{st}$ (mAh/g) | $50^{th}/1^{st}$ (%) |
| Comparative Example 6 | 242 | 221 | 91 | 222 | 218 | 209 | 203 | 199 | 95 | 207 | 85.6 |
| Comparative Example 7 | 243 | 219 | 90 | 221 | 217 | 208 | 202 | 199 | 95 | 206 | 90.1 |
| Comparative Example 8 | 242 | 218 | 90 | 221 | 217 | 207 | 201 | 199 | 95 | 205 | 91.5 |
| Example 3 | 242 | 219 | 91 | 222 | 217 | 207 | 202 | 199 | 95 | 205 | 91.5 |
| Example 4 | 244 | 213 | 88 | 219 | 216 | 207 | 201 | 198 | 97 | 206 | 94.9 |
| Example 5 | 243 | 211 | 87 | 218 | 215 | 206 | 200 | 197 | 98 | 205 | 92.3 |

Figure 17:
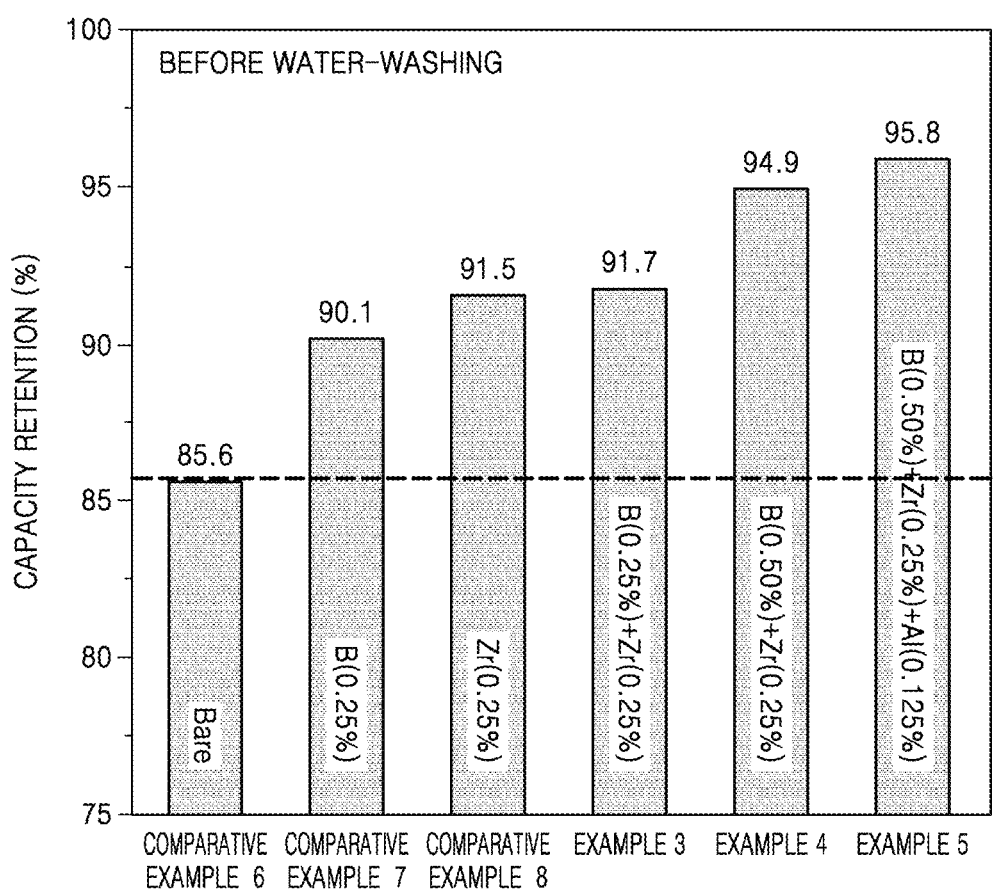
FIG. 17 is a graph of capacity retention (%) versus test sample, which compares the capacity retention of the positive active materials prepared in Examples 3 to 5 and Comparative Examples 6 to 8, before water-washing of the positive active material, and after 50 cycles of charging/discharging.

FIG. 17 shows a graph of comparing capacity retention ratios after 50 cycles of charging/discharging performed on the lithium secondary batteries prepared in Examples 3 to 5 and Comparative Example 6 to 8.

As shown in Table 6 and FIG. 17, it may be confirmed that lifespan characteristics of the lithium secondary batteries improved due to doping and coating of B and metal.

Also, in order to confirm doping and coating effects after water-washing of the positive active materials prepared in Examples 3 to 5 and Comparative Examples 6 to 8, the positive active materials prepared in Examples 3 to 5 and Comparative Examples 6 to 8 were mixed with 40 g of water on the basis of 40 g of the positive active materials, and 2.04 ml of 1M $CoCl_2$ solution was added thereto with respect to the amount of 0.3 wt % cobalt (Co). A drying process was performed thereon at a temperature of about 150° C. for 3 hours, and in addition, to recover the surface damaged during the washing using water, a heat-treatment process was performed thereon at a temperature of about 720° C. for 5 hours. Then, the resulting positive active materials were used in lithium secondary batteries. In the same manner, the initial efficiency, capacity, rate characteristics, and lifespan characteristics were measured, and the results are shown in Table 7.

TABLE 7

| | Formation (1st cycle) | | | Rate characteristics | | | | | | Cycle life | |
|---|---|---|---|---|---|---|---|---|---|---|---|
| Sample Name | 0.1 C Cha (mAh/g) | 0.1 C Dis (mAh/g) | I.E. (%) | 0.2 C Dis (mAh/g) | 0.33 C Dis (mAh/g) | 1 C Dis (mAh/g) | 2 C Dis (mAh/g) | 3 C Dis (mAh/g) | 1 C/0.1 C (%) | 1st (mAh/g) | 50th/1st (%) |
| Comparative Example 6 | 245 | 229 | 94 | 223 | 219 | 209 | 204 | 200 | 91 | 205 | 87.5 |
| Comparative Example 7 | 248 | 230 | 93 | 222 | 220 | 210 | 205 | 201 | 91 | 206 | 89.6 |
| Comparative Example 8 | 245 | 228 | 93 | 221 | 217 | 208 | 203 | 200 | 92 | 204 | 90.6 |
| Example 3 | 249 | 228 | 92 | 220 | 215 | 206 | 201 | 199 | 91 | 203 | 93.2 |
| Example 4 | 245 | 220 | 90 | 220 | 217 | 208 | 203 | 200 | 95 | 200 | 92.3 |
| Example 5 | 242 | 217 | 90 | 216 | 213 | 204 | 199 | 195 | 94 | 199 | 91.5 |

Figure 18:
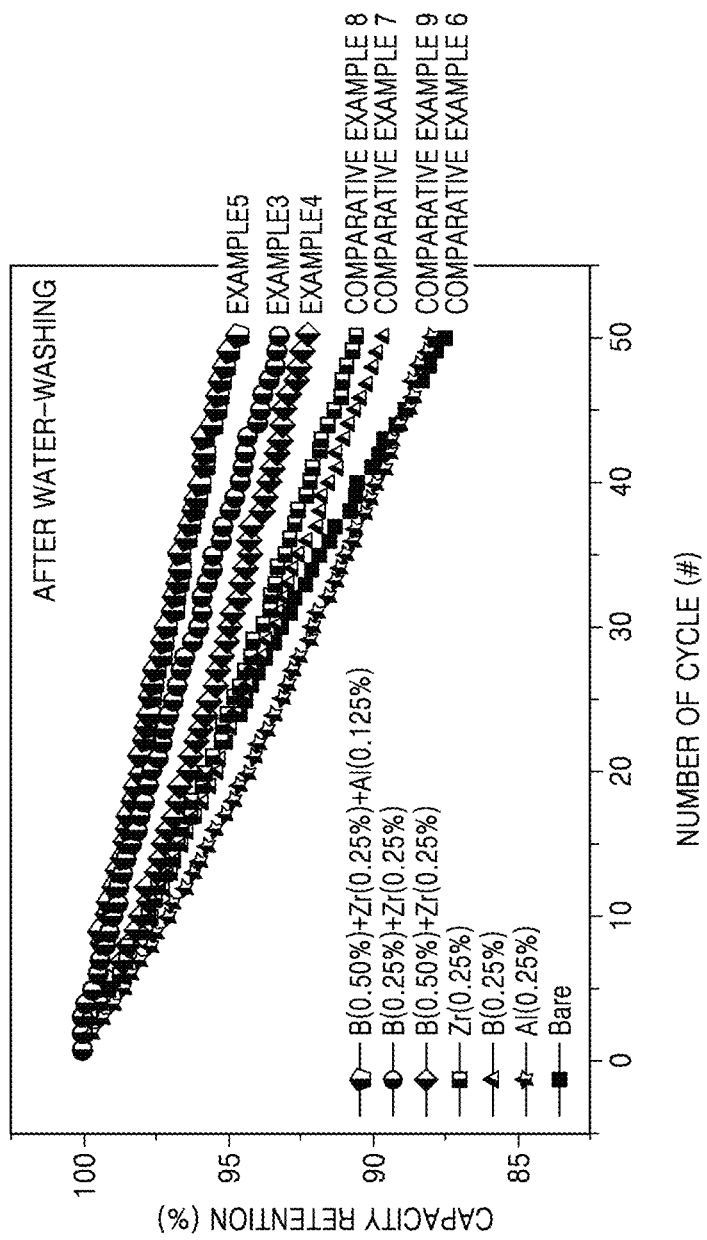
FIG. 18 is a graph of capacity retention (%) versus cycle number showing the results of the positive active materials prepared in Examples 3 to 5 and Comparative Examples 6 to 9, after water-washing of the positive active material, and after 50 cycles of charging/discharging.

FIG. 18 shows a graph of capacity retention ratio per cycle of the lithium secondary batteries including the positive active materials prepared in Examples 3 to 5 and Comparative Examples 6 to 9 after the water-washing.

As shown in Table 7 and FIG. 18, the effect of doping and coating of B and the metal element significantly maintains the capacity retention after controlling an amount of the residual lithium after the water-washing, and thus it was confirmed that lifespan characteristics of the lithium secondary batteries improved.

The electrode active material may be obtained by simultaneously and easily doping a core active material with boron and a metal element and coating the core active material with a borate compound, the borate compound including the same metal element as the doped metal element, using a one-step process, and may increase the lifespan characteristics of the lithium secondary battery by doping the aluminum borate compound in the core active material.

While one or more embodiments have been described with reference to the drawings and embodiments, it will be understood by those of ordinary skill in the art that various changes in form and details may be made therein without departing from the spirit and scope as defined by the following claims.

What is claimed is:

1. An electrode active material comprising:
a core active material having a layered structure and capable of reversibly incorporating and deincorporating lithium;
a dopant comprising boron and a first metal element in the core active material, wherein the boron and the first metal element are paired together in the layered structure of the core active material; and
a coating having a nanostructure disposed on a surface of the core active material and comprising a metal borate compound comprising a second metal element,
wherein the second metal element is the same as the first metal element,
wherein the metal borate compound is represented by Formula 1, $$M_xB_yO_z \qquad \text{Formula 1}$$

wherein, in Formula 1,
M is aluminum, zirconium, calcium, barium, bismuth, tin, zinc, silicon, strontium, titanium, vanadium, chromium, iron, copper, niobium, molybdenum, ruthenium, palladium, silver, cadmium, tantalum, tungsten, iridium, platinum, gold, or a combination thereof, and
x, y, and z satisfy $1 \leq x < 30$, $1 \leq y < 10$, and $1 < z < 40$, and
wherein the core active material is a compound represented by Formula 3, $$LiNi_xM^1{}_{1-x}O_{2-e}M'_e \qquad \text{Formula 3}$$

wherein, in Formula 3,
$M^1$ is a Group 4 to a Group 14 element, or a combination thereof,
M' is an anion element comprising F, S, Cl, Br, or a combination thereof, and
x and e satisfy $0.7 \leq x < 1$ and $0 \leq e < 1$.

2. The electrode active material of claim 1, wherein the first metal element is configured to contract or expand the layered structure of the core active material, and comprises aluminum, zirconium, calcium, barium, bismuth, tin, zinc, silicon, strontium, titanium, vanadium, chromium, iron, copper, niobium, molybdenum, ruthenium, palladium, silver, cadmium, tantalum, tungsten, iridium, platinum, gold, or a combination thereof.

3. The electrode active material of claim 2, wherein the dopant further comprises lithium.

4. The electrode active material of claim 1, wherein the boron and the first metal element are configured to contract or expand the layered structure of the core active material.

5. The electrode active material of claim 1, wherein a total amount of boron and the first metal element in the dopant, and boron and the second metal element contained in the metal borate compound is in a range of about 0.3 mole percent to about 10 mole percent based on 1 mole of the core active material.

6. The electrode active material of claim 5, wherein the total amount of the first metal element and the second metal element is about 0.25 mole percent or greater based on 1 mole of the core active material.

7. The electrode active material of claim 1, wherein a molar ratio of the total amount of the first metal element and the second metal element to the total amount of boron in the dopant and boron contained in the metal borate compound is in a range of about 1:10 to about 30:1.

8. The electrode active material of claim 1, wherein an aspect ratio of the nanostructure is in a range of about 1 to about 200.

9. The electrode active material of claim 1, wherein the nanostructure comprises a nanowire, a nanorod, a nanoplate, a nanobelt, a nanoribbon, or a combination thereof.

10. The electrode active material of claim 1, wherein the metal borate compound is an aluminum borate compound, a zirconium borate compound, a Li-containing aluminum borate compound, a Li-containing zirconium borate compound, or a combination thereof.

11. The electrode active material of claim 10, wherein the aluminum borate compound comprises $AlBO_3$, $Al_4B_2O_9$, $Al_5BO_9$, $Al_{18}B_4O_{33}$, or a combination thereof.

12. The electrode active material of claim 10, wherein the zirconium borate compound comprises $ZrBO_3$, $ZrB_2O_5$, $LiZrB_3O_7$, $Li_2ZrB_4O_9$, or a combination thereof.

13. The electrode active material of claim 10, wherein the dopant comprises $AlB$, $Al_4B_2$, $Al_5B$, $Al_{18}B_4$, $ZrB$, $ZrB_2$, $ZrB_3$, $ZrB_4$, or a combination thereof.

14. The electrode active material of claim 1, wherein an interlayer distance of the layered structure of the core active material with the dopant is increased as compared to an interlayer distance of the layered structure of the core active material without the dopant.

15. The electrode active material of claim 1, wherein the residual lithium is in an amount in a range of about 100 parts per million to about 20,000 parts per million.

16. The electrode active material of claim 1, wherein the core active material is a secondary particle comprising agglomerated primary particles, and the coating having a nanostructure comprising the metal borate is disposed on a surface of the primary particle, a grain boundary between the primary particles, a surface of the secondary particle, or a combination thereof.

17. A lithium secondary battery comprising:
a positive electrode, and
a negative electrode,
wherein at least one of the positive electrode or the negative electrode comprises the electrode active material of claim 1.

18. A method of preparing the electrode active material of claim 1, the method comprising:
dry-mixing a precursor material for the core active material of Formula 3, a first metal element precursor, and a borate precursor to prepare a mixture; and
heat-treating the mixture to prepare the electrode active material, wherein the electrode active material comprises
the core active material having a layered structure and capable of reversibly incorporating and deincorporating lithium,
the dopant comprising boron and the first metal element in the core active material, wherein the boron and the first metal element are paired together in the layered structure of the core active material, and
the coating having a nanostructure disposed on a surface of the core active material and comprising a metal borate compound comprising a second metal element,
wherein the second metal element is the same as the first metal element,
wherein the metal borate compound is represented by Formula 1,

          Formula 1 wherein, in Formula 1,
M is aluminum, zirconium, calcium, barium, bismuth, tin, zinc, silicon, strontium, titanium, vanadium, chromium, iron, copper, niobium, molybdenum, ruthenium, palladium, silver, cadmium, tantalum, tungsten, iridium, platinum, gold, or a combination thereof, and
x, y, and z satisfy 1≤x<30, 1≤y<10, and 1<z<40, and
wherein the core active material is a compound represented by Formula 3,

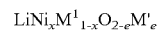          Formula 3 wherein, in Formula 3,
$M^1$ is a Group 4 to a Group 14 element, or a combination thereof,
M' is an anion element comprising F, S, Cl, Br, or a combination thereof, and
x and e satisfy 0.7≤x<1 and 0≤e<1.

19. The method of claim 18, wherein the precursor material for the core active material is in the form of a hydrate.

20. The method of claim 18, wherein the metal element precursor comprises an aluminum precursor, a zirconium precursor, an aluminum hydrate precursor, a zirconium hydrate precursor, or a combination thereof.

21. The method of claim 20, wherein the aluminum precursor comprises $Al(NO_3)_3$, $Al_2O_3$, $AlPO_4$, $Al(OH)_3$, $Al(ClO_4)_3$, $AlK(SO_4)_2$, $Al_2(SO_4)_3$, $Al_2S_3$, $AlF_3$, or a combination thereof;
the zirconium precursor comprises of $Zr(NO_3)_4$, $ZrO_2$, $Zr(HPO_4)_2$, $Zr(OH)_4$, $Zr(ClO_4)_4$, $Zr(SO_4)_2$, $(CH_3CO_2)_xZr(OH)_y$, wherein x+y=4, $ZrCl_4$, $ZrF_4$, or a combination thereof; and
the borate precursor comprises $H_2BH_3$, $LiBH_4$, $NaBO_4$, $KBH_4$, $Mg(BH_4)_2$, $Ca(BH_4)_2$, $Sr(BH_4)_2$, $NH_3BH_3$, $Al(BH_4)_3$, or a combination thereof.

22. The method of claim 18, wherein an amount of the metal element precursor and the borate precursor are selected such that a molar ratio of the metal element in the metal element precursor to boron is in a range of about 1:10 to about 30:1.

23. The method of claim 18, wherein the heat-treating of the mixture is performed in air or in an oxygen atmosphere at a temperature of about 600° C. to about 1,000° C.

24. The method of claim 18, further comprising washing the electrode active material after the heat-treating.

25. The method of claim 24, wherein an amount of residual lithium in the electrode active material before the washing is in a range of about 1,000 parts per million to about 20,000 parts per million, and an amount of residual lithium in the electrode active material after the washing is in a range of about 100 parts per million to about 5,000 parts per million.

* * * * *